(12) United States Patent  
Azumi et al.

(10) Patent No.: US 7,267,488 B2  
(45) Date of Patent: Sep. 11, 2007

(54) ROLLING BEARING AND SPINDLE DEVICE FOR MACHINE TOOLS

(75) Inventors: Saburo Azumi, Kanagawa (JP); Yasushi Morita, Kanagawa (JP); Naoki Matsuyama, Kanagawa (JP); Takaaki Anzai, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/052,047

(22) Filed: Feb. 8, 2005

(65) Prior Publication Data

US 2005/0129342 A1     Jun. 16, 2005

Related U.S. Application Data

(62) Division of application No. 10/208,774, filed on Aug. 1, 2002, now Pat. No. 6,869,223.

(30) Foreign Application Priority Data

Aug. 1, 2001 (JP) .......................... P.2001-233706  
Jul. 9, 2002 (JP) .......................... P.2002-200172

(51) Int. Cl.  
*F16C 33/66* (2006.01)

(52) U.S. Cl. ....................................... 384/474

(58) Field of Classification Search ................ 384/466, 384/475, 474, 513, 569  
See application file for complete search history.

(56) References Cited

U.S. PATENT DOCUMENTS 3,195,965 A    7/1965  Dorn 3,722,967 A    3/1973  Lewis  
4,671,681 A    6/1987  LaRou

FOREIGN PATENT DOCUMENTS

| DE | 866 745 C | 12/1952 |
|---|---|---|
| DE | 1 168 185 B | 4/1964 |
| DE | 37 13 814 A1 | 1/1988 |
| DE | 44 04 301 A1 | 8/1995 |
| DE | 199 46 584 A1 | 5/2001 |
| DE | 199 52 602 C1 | 5/2001 |
| JP | 55-43357 U | 3/1980 |
| JP | 1-67332 | 4/1989 |
| JP | 5-52350 | 7/1993 |

(Continued)

OTHER PUBLICATIONS

German Journal, Antriebstechnik 13 (1974), No. 5, pp. 249-251.

(Continued)

*Primary Examiner*—Lenard A. Footland  
(74) *Attorney, Agent, or Firm*—Sughrue Mion Pllc.

(57) ABSTRACT

A grease-lubricated rolling bearing has an outer ring having an outer ring race in an inner peripheral surface thereof, an inner ring having an inner ring race on an outer peripheral surface thereof, rolling elements rollably provided between the outer ring race and the inner ring race, and a grease supply element for supplying an additional grease in the rolling bearing. The amount of the additional grease to be supplied at a time is predetermined to be from 0.1 to 4% of the volume of space in the bearing.

11 Claims, 18 Drawing Sheets

FOREIGN PATENT DOCUMENTS

| | | |
|---|---|---|
| JP | 5-57445 | 7/1993 |
| JP | 5-57446 | 7/1993 |
| JP | 5-87326 | 11/1993 |
| JP | 7-103228 | 4/1995 |
| JP | 9-14274 | 1/1997 |
| JP | 09-068231 A | 3/1997 |
| JP | 2000-120703 A | 4/2000 |
| JP | 2000-169872 A | 6/2000 |
| JP | 2000-192972 | 7/2000 |
| JP | 2000-205267 A | 7/2000 |
| JP | 2000-291667 | 10/2000 |
| JP | 2001-099161 A | 4/2001 |

OTHER PUBLICATIONS

German catalog 307, INA Nadellager-Zylinderrollenlager ["needle-bearing type cylindrical roller bearing"], Article No. 204-500-1/307 D-D 039710, p. 53, no date.

ROLLING BEARING AND SPINDLE DEVICE FOR MACHINE TOOLS

This is a divisional of application Ser. No. 10/208,774 filed on Aug. 1, 2002 now U.S. Pat. No. 6,869,223.

BACKGROUND OF THE INVENTION

1. Field of the Invention

The present invention relates to a rolling bearing for use in a spindle for machine tools which operates at a high rotary speed or the like.

2. Description of the Related Art

A bearing for spindle of machine tools is required to be excellent in properties such as vibration resistance and acoustic properties for the purpose of enhancing the precision in machining. The bearing for spindle of machine tools is also required to undergo lubrication with grease, which can be easily handled and advantageous from the environmental and economical. standpoints of view, operate at a high rotary speed and exhibit a prolonged lifetime.

In general, grease-lubricated rolling bearings to be incorporated in the spindle of machine tools are lubricated only with the grease which has been initially filled therein to prevent heat generation. When the rolling bearing is allowed to operate at a high rotary speed free from running-in of grease at the initial stage after filling of grease, abnormal heat generation occurs due to catching of grease or agitation resistance. Therefore, it is normally practiced to effect running-in for several times to optimize the conditions of the grease.

The recent trend is for more spindle for machine tools to operate at a higher rotary speed. It has not been seldom that the bearing for supporting the spindle is used in an operating condition where dmN (=(inner diameter of bearing +outer diameter of bearing)÷2×rotary speed (rpm)) is not lower than 1,000,000.

As compared with rolling bearings lubricated with oil air or oil mist, grease-lubricated rolling bearings tend to exhibit a reduced lifetime in high speed operation. The grease-lubricated bearings undergo seizing due to deterioration of grease before deterioration due to rolling fatigue. When the grease-lubricated rolling bearings operate at a remarkably high rotary speed, the grease deteriorates in a short period of time, causing seizing in early stage.

For example, Japanese Utility Model Laid-Open No. 1989-67331, Japanese Utility Model Laid-Open No. 1992-132220, Japanese Utility Model Laid-Open No. 1994-35659, Japanese Utility Model Laid-Open No. 1994-35653, Japanese Utility Model Laid-Open No. 1993-94531, Japanese Utility Model Laid-Open No. 1993-94532, Japanese Utility Model Laid-Open No. 1994-35655, and Japanese Utility Model Laid-Open No. 1994-35657 disclose a technique comprising a grease reservoir provided on the inner ring side and involving the continuous supply of grease by centrifugal force. Further, Japanese Utility Model Laid-Open No. 1993-86029 discloses a technique involving the effective use of grease filled in the bearing space utilizing air.

However, these techniques leave something to be desired in improvement.

SUMMARY OF THE INVENTION

The invention has been worked out under these circumstances. An aim of the invention is to provide a rolling bearing which is advantageous from the environmental and economical standpoints of view, can operate at a high rotary speed and exhibits a prolonged life.

The aforementioned aim of the invention is accomplished by the following constitutions.

(1) A grease-lubricated rolling bearing comprising;

an outer ring having an outer ring race in an inner peripheral surface thereof;

an inner ring having an inner ring race on an outer peripheral surface thereof;

rolling elements rollably provided between the outer ring race and the inner ring race; and a grease supply element for supplying an additional grease in the rolling bearing, wherein the amount of the additional grease to be supplied at a time is predetermined to be from 0.1 to 4% of the volume of space in the bearing.

(2) The rolling bearing according to (1), wherein the grease supplying element is a supply hole provided in the outer ring.

(3) The rolling bearing according to (2), wherein the supply hole is radially provided.

(4) The rolling bearing according to (2), wherein the supply hole is axially provided.

(5) The rolling bearing according to (1), further comprising an outer ring spacer, wherein the grease supplying element is a supply hole provided in the outer ring spacer.

(6) The rolling bearing according to (1), wherein the rolling element is a cylindrical roller.

(7) The rolling bearing according to (2), wherein the rolling element is a ball, wherein the ball is disposed between the inner ring race of the inner ring and the outer ring race of the outer ring with a contact angle, and wherein the supply hole provided in the outer ring opens at a position depart from a contact area between the ball and the outer ring race.

(8) The rolling bearing according to (1), wherein the rolling bearing is used to support a spindle of a machine tool.

(9) The rolling bearing according to (2), wherein the diameter of the supply hole is from 0.1 mm to 5 mm.

(10) The rolling bearing according to (5), wherein the diameter of the supply hole is from 0.1 mm to 5 mm.

(11) The rolling bearing according to (1), wherein the rolling bearing is used in an operating condition where dmN is not smaller than 1,000,000.

(12) The rolling bearing according to (2), further comprising a retainer for retaining the rolling elements, wherein the retainer is guided by the outer ring and has a guide surface, and wherein the supply hole opens toward the guide surface of the retainer.

(13) The rolling bearing according to (6), wherein the grease supply element is a supply hole provided in the outer ring, wherein the outer ring has relief portions at both end portions of the outer ring race, and wherein the supply hole is formed to communicate with the relief portion.

(14) A spindle device for a machine tool, comprising a rolling bearing mounted in a housing for supporting a spindle, the rolling bearing being grease-lubricated, the rolling bearing comprising:

an outer ring having an outer ring race in an inner peripheral surface thereof;

an inner ring having an inner ring race in an outer peripheral surface thereof;

rolling elements rollably provided between the outer ring race and the inner ring race; and a grease supplying element for supplying an additional grease in the rolling bearing, wherein the amount of the additional grease to be supplied at a time is predetermined to be from 0.1% to 4%.

(15) The spindle device according to (14), wherein the grease supplying element is a supply hole provided in the outer ring.

(16) The spindle device according to (15), wherein the supply hole is radially provided.

(17) The spindle device according to (15), wherein the supply hole is axially provided.

(18) The spindle device according to (14), further comprising an outer ring spacer, wherein the grease supplying element is a supply hole provided in the outer ring spacer.

(19) The spindle device according to (14), wherein the grease supplying element is a supply hole provided in a housing.

The term "volume of space of the bearing" as used herein is meant to indicate the value obtained by subtracting the volume of the rolling elements and the volume of the retainer from the volume of the space between the inner diameter of the outer ring and the outer diameter of the inner ring.

In accordance with the rolling bearing having the aforementioned constitution, the grease is additionally supplied from the outer ring side (radially) or from the outer ring spacer (axially) before the grease is early deteriorated to damage the bearing, making it possible to prolong the bearing life. When supplied from the outer ring side, the grease passes through the supply hole into the space of the bearing from the inner peripheral surface of the outer ring. On the other hand, when supplied from the outer ring spacer side, the grease passes through the supply hole and is then directly axially supplied into the space of the bearing. In this case, it is preferred that the grease be supplied onto the inner peripheral surface side rather than onto the outer peripheral surface side. The grease thus supplied is then attached to the rolling elements and the retainer. As the rolling elements and the retainer rotates, the grease extends all over the rolling elements and the entire surface of the interior of the bearing.

In general, the standard amount of the grease to be initially injected into an angular contact ball bearing mounted in the spindle of machine tools is considered to be from 10% to 20% of the volume of the space of the bearing. On the other hand, the standard amount of the grease to be initially injected into a cylindrical roller bearing mounted in the spindle of machine tools is considered to be from 8% to 15% of the volume of the space of the bearing. This is based on the requirements that the period of time during which the initial running-in of the grease is effected be reduced and the temperature rise be inhibited. In particular, a cylindrical roller bearing is disadvantageous in that when the initial running-in of the grease is effected, the rollers which are rolling occasionally catch the grease, causing abnormal temperature rise. In the worst case, seizing can occur.

By thus predetermining the amount of the grease to be supplied to be not greater than 4% of the volume of the space of the bearing at a time, the period of time during which the running-in is effected can be reduced while avoiding abnormal temperature rise. As a result of extensive studies, it was found that when the amount of the grease to be supplied at a time is 0.1% of the volume of the space of the bearing, lubrication can be made according to minimum requirements.

In the case of a bearing having an angle of contact and comprising balls as rolling elements such as angular contact ball bearing, when a supply hole is provided on the inner peripheral surface of the outer ring at the position depart from the contact area on the outer ring race, the damage during operation can be prevented.

When the diameter of the supply hole is from 0.1 mm to 5 mm, the supply of the grease in a constant amount can be smoothly effected. In other words, the grease cannot clog the supply hole and cannot be excessively supplied. The sectional shape of the supply hole is not limited to circle. For example, the supply hole may have a rectangular or polygonal section having the same area as that of a circle having a diameter of from 0.1 mm to 5 mm.

The aforementioned rolling bearing can exhibit a prolonged life even in an operating condition where dmN is not smaller than.1,000,000.

DETAILED DESCRIPTION OF THE PREFERRED EMBODIMENTS

Embodiments of implementation of the invention will be described in connection with the attached drawings.

Figure 1:
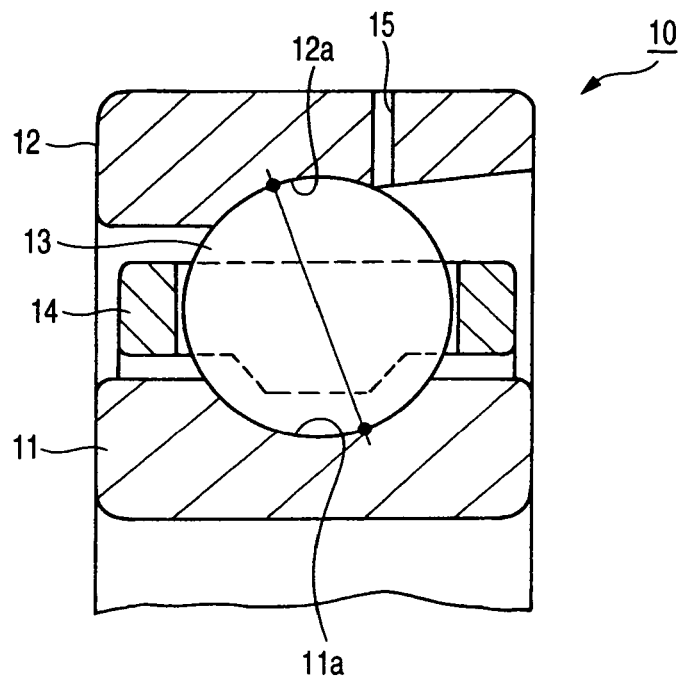
FIG. 1 is a sectional view illustrating the first embodiment of the invention.

The angular contact ball bearing 10 according to the first embodiment of the invention shown in FIG. 1 comprises an inner ring 11 having an inner ring race 11a provided on the outer peripheral surface thereof, an outer ring 12 having an outer ring race 12a provided on the inner peripheral surface thereof, a plurality of balls 13 disposed along an inner ring race 11a and an outer ring race 12a formed between the inner and outer rings 11, 12, and a retainer 14 for retaining peripherally the balls 13 at regular intervals. The present embodiment is an outer ring counterbore bearing. The present embodiment is a rolling bearing for supporting the spindle of machine tools.

In the present embodiment, the outer ring 12 has a supply hole 15 formed on the counterbore side thereof (right side as viewed on the drawing) as a supplying element extending radially through the outer ring 12. The supply hole 15 has a circular section having a diameter of from 0.1 mm to 5 mm. The supply hole 15 opens at the position adjacent to the outer ring race 12a on the inner peripheral surface of the outer ring 12.

The supply holes 15 may be provided in a plurality of positions arranged along the periphery of the outer ring 12 at regular intervals.

In the space of the angular contact ball bearing 10, grease is initially filled in an amount of from 10% to 20% of the volume of the space of the bearing. In operation, the bearing is supplied with the grease in the following manner. In some detail, the grease is shot through the supply hole 15 at a proper timing (intermittently or regularly) in such an amount that the amount of the grease to be supplied at a time is from 0.1% to 4% of the volume of the space of the bearing.

Figure 2:
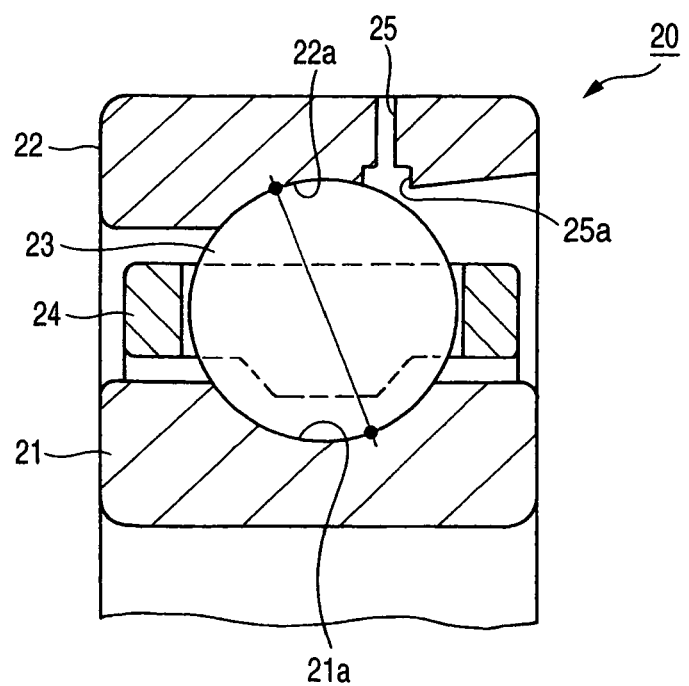
FIG. 2 is a sectional view illustrating the second embodiment of the invention.

The angular contact ball bearing 20 according to the second embodiment of the invention shown in FIG. 2 includes an inner ring 21, an outer ring 22, a plurality of balls 23 disposed between an inner ring race 21a and an outer ring race 22a on the inner and outer rings 21, 22, respectively, and a retainer 24 for retaining the balls 23 peripherally at regular intervals.

In the present embodiment, the outer ring 22 has a supply hole 25 formed on the counterbore side thereof (right side as viewed on the drawing) as a supplying element extending radially through the outer ring 22. The supply hole 25 forms a grease reservoir 25a on the inner peripheral surface of the outer ring. The sectional area of the grease reservoir 25a is greater than that of the other portions of the supply hole 25. Due to the arrangement of the grease reservoir 25a, the supply hole 25 forms a stepped cylindrical space. The grease reservoir 25a is disposed at the position adjacent to the outer ring race 22a on the inner peripheral surface of the outer ring 22.

In the embodiments described below, the supply hole may have a grease reservoir.

Figure 3:
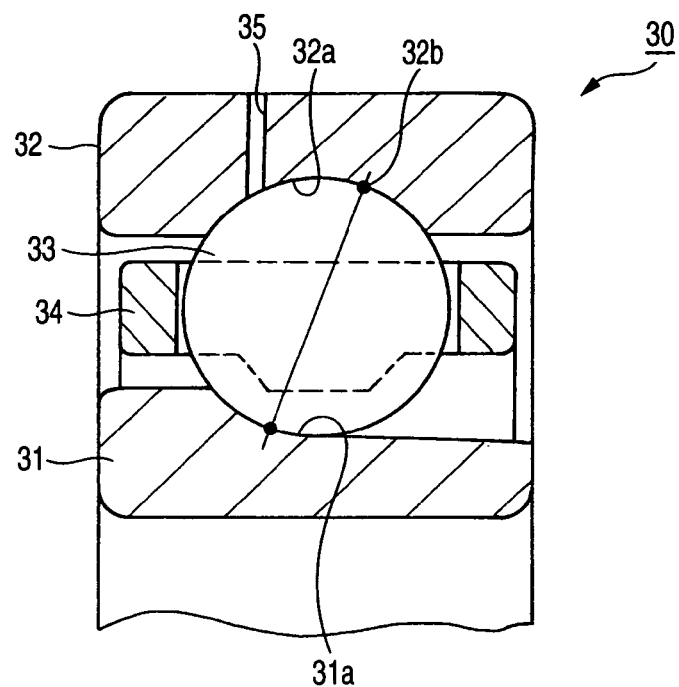
FIG. 3 is a sectional view illustrating the third embodiment of the invention.

The angular contact ball bearing 30 according to the third embodiment of the invention shown in FIG. 3 includes an inner ring 31, an outer ring 32, a plurality of balls 33 disposed between an inner ring race 31a on the inner ring 31 and an outer ring race 32a on the outer ring 32 and a retainer 34 for retaining the balls 33 peripherally at regular intervals. The present embodiment is an inner ring counterbore bearing.

In the present embodiment, the outer ring 32 has a supply hole 35 formed on the outer ring race 32a of the outer ring 32 on the side thereof oppoposition the contact portion 32b (right side as viewed on the drawing) as a supplying element extending radially through the outer ring 32. The supply hole 35 maybe provided on the contact portion 32b side at the position other than the contact portion 32b.

Figure 4:
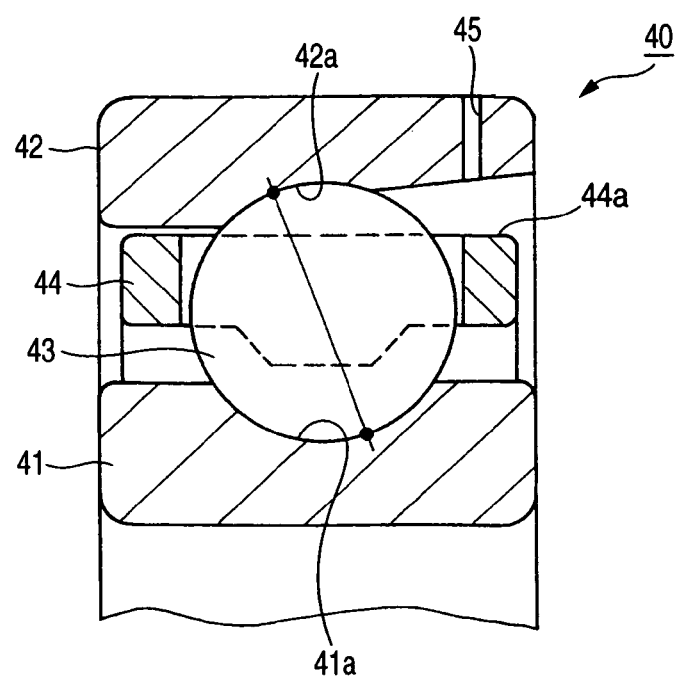
FIG. 4 is a sectional view illustrating the fourth embodiment of the invention.

The angular contact ball bearing 40 according to the fourth embodiment of the invention shown in FIG. 4 includes an inner ring 41, an outer ring 42, a plurality of balls 43 disposed between an inner ring race 41a of the inner ring 41 and an outer ring race 42a of the outer ring 42, and a retainer 44 being guided by the outer ring. The present embodiment is an outer ring counterbore bearing.

In the present embodiment, the outer ring 42 has a supply hole 45 provided on the counterbore side thereof (right side as viewed on the drawing) as a supplying element extending radially through the outer ring 42. The opening of the supply hole 45 is disposed opposed to a guide surface 44a on one side (right side as viewed on the drawing) of the retainer 44.

Figure 5:
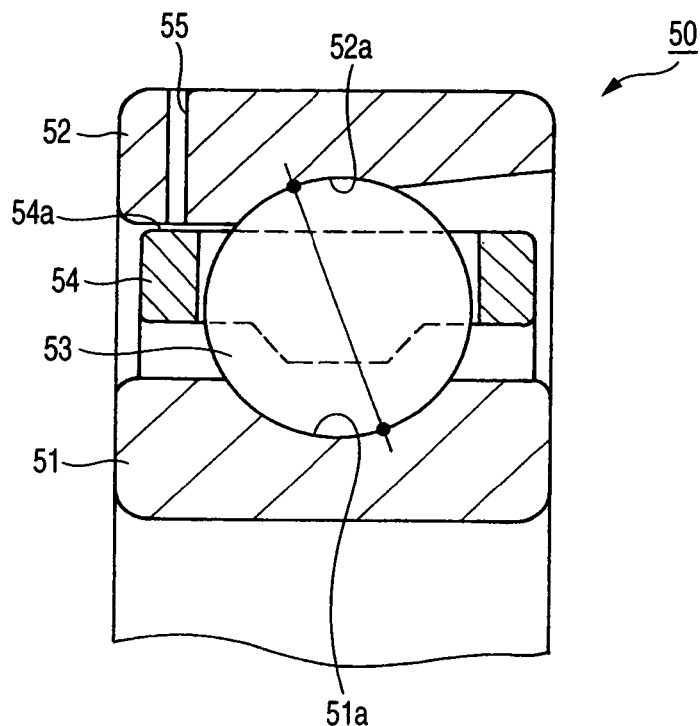
FIG. 5 is a sectional view illustrating the fifth embodiment of the invention.

The angular contact ball bearing 50 according to the fifth embodiment of the invention shown in FIG. 5 includes an inner ring 51, an outer ring 52, a plurality of balls 53 disposed between an inner ring race 51a of the inner ring 51 and an outer ring race 52a of the outer ring 52, and a retainer 54 being guided by the outer ring. The present embodiment is an outer ring counterbore bearing.

In the present embodiment, the outer ring 52 has a supply hole 55 provided on the side thereof oppoposition the counterbore (left side as viewed on the drawing) as a supplying element extending radially through the outer ring 52. The opening of the supply hole 55 is disposed opposed to a guide surface 54a on one side (left side as viewed on the drawing) of the retainer 54.

Using an angular contact ball bearing having a form shown in FIG. 1, the following experiment was made.

A pair of angular contact ball bearings having an inner diameter of 65 mm, an outer diameter of 100 mm, a width of 18 mm and a contact angle of 18° which each comprise balls having a diameter of 7.144 mm and are supplied with Isoflex NBU15 as a grease in such a manner that the amount of the grease to be initially injected is 15% of the space of the volume of the bearing (2.3 cc) were used to support the rotary spindle of the testing machine. The pair of angular contact ball bearings were arranged back-to-back at a gap of 100 mm.

(Experiment 1)

The rotary spindle of the testing machine was rotated at respective predetermined speeds where the bearing was measured for durability life. The results are set forth in Table 1.

TABLE 1

| dmN (×10,000) | Circumferential speed of inner ring (m/s) | Durability life (h) | Conditions |
| --- | --- | --- | --- |
| 180 | 89 | 100 | Blackened grease, drastically abraded race |
| 150 | 74 | 1,000 | Blackened grease, drastically abraded race |
| 120 | 59 | 10,000 | Grayed grease, drastically abraded race |
| 100 | 49 | 50,000 or more | Grayed grease |

In the case where no grease was supplied, a durability life of more than 10,000 hours was not attained at dmN of 1,200,000. This demonstrates that the grease lifetime was 10,000 hours. The grease lifetime at dmN of 1,500,000 was 1,000 hours. At dmN of 1,800,00, the grease lifetime was 100 hours.

Figure 6:
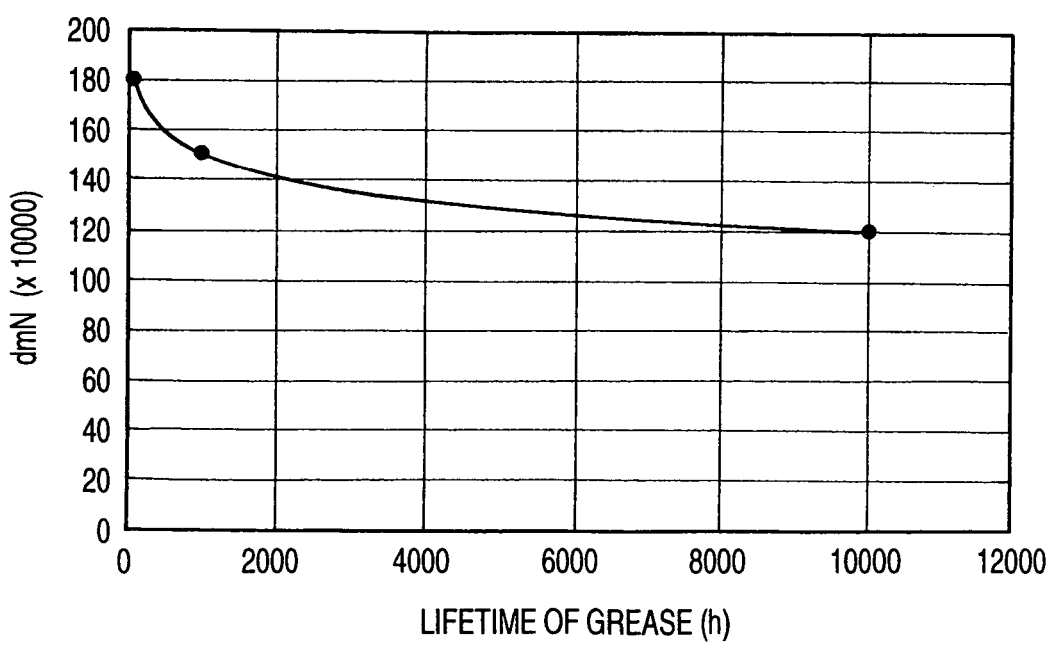
FIG. 6 is a graph illustrating the results of the experiment using the first embodiment of the invention.

The results of Table 1 are represented graphically in FIG. 6. As can be seen in FIG. 6, as dmN rises, the grease lifetime decreases exponentially.

(Experiment 2)

The rotary spindle of the testing machine was supported by a pair of angular contact ball bearings in the same manner as in Experiment 1. Under these conditions, a proper running-in operation was then made. After the running-in operation, the outer ring temperature at dmN of 1,500,000 was 55° C. The grease lifetime at dmN of 1,500,000 was 1,000 hours as mentioned above.

In this experiment, when operation was made at dmN of 1,500,000 for 1,000 hours, the grease was supplied in respective predetermined amounts. Thereafter, dmN was raised from 0 to 1,500,000 in 5 seconds to resume the operation. At the same time, the bearing was observed to measure the durability life and temperature rise of the bearing at the respective predetermined supplied amounts. The results are set forth in Table 2.

TABLE 2

| Amount of grease (% in space volume) | Durability life (hrs) | | | | Abnormal temperature rise |
| --- | --- | --- | --- | --- | --- |
|  | 300 | 500 | 700 | 900 |  |
| 2 | Good | Good | Poor | Poor | Good |
| 4 | Good | Good | Poor | Poor | Good |
| 6 | Good | Good | Good | Poor | Poor |
| 10 | Good | Good | Good | Good | Poor |

In the case where the supplied amount of grease was not greater than 4%, when 500 hours, which is half the lifetime of the grease initially filled, passed, seizing occurred.

On the other hand, when the supplied amount of grease exceeded, the bearing showed abnormal temperature rise (outer ring showed a sudden temperature rise to 75° C. or higher) after the supply of the grease.

As can be seen in the aforementioned results, it is preferred that the interval of time at which the grease is supplied be not greater than half the lifetime of the grease initially filled and the amount of the grease to be supplied be not greater than 4% of the volume of the space of the bearing.

When a running-in operation was conducted after the supply of the grease in an amount of 2%, the grease which had been caught by the side of the contact portion in the bearing was then collected and measured for weight. As a result, it was found that 1.9% out of 2% of the grease supplied had been caught. This demonstrates that the minimum required amount of the grease had been retained by the rolling elements (balls), the races on the inner and outer rings and the retainer as a lubricant film and the excess grease had been discharged.

It was thus found that the lower limit of the amount of the grease to be supplied is 0.1% of the volume of the space of the bearing.

Figure 7:
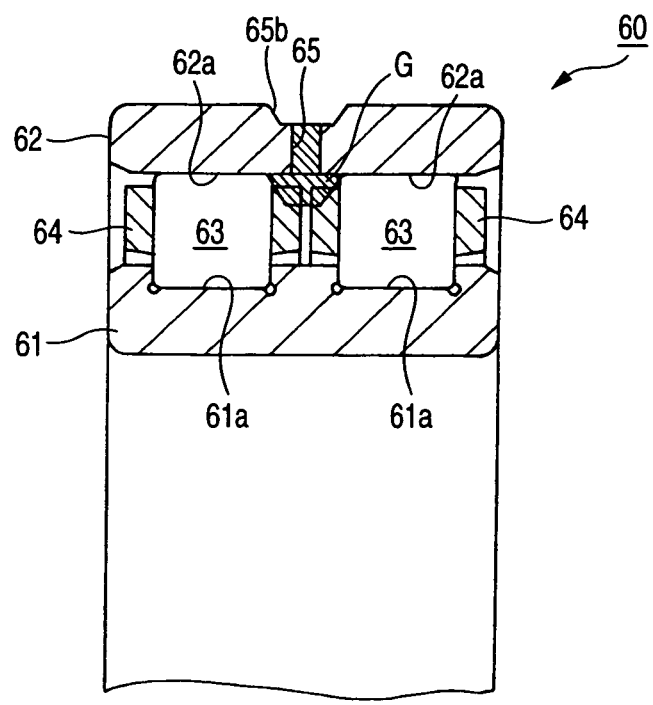
FIG. 7 is a sectional view illustrating the sixth embodiment of the invention.

The double-row cylindrical roller bearing 60 according to the sixth embodiment of the invention shown in FIG. 7 includes an inner ring 61, an outer ring 62, a plurality of cylindrical rollers 63 arranged in two rows between an inner ring race 61a of the inner ring 61 and an outer ring race 62a of the outer ring 62, and a retainer 64 for retaining the cylindrical rollers 63 in the respective rows peripherally at regular intervals. The present embodiment is a rolling bearing for supporting the spindle of machine tools.

In the present embodiment, the outer ring 62 has a supply hole 65 formed in the axially central portion thereof as a supplying element extending radially through the outer ring 62. The supply hole 65 has a circular section having a diameter of from 0.1 mm to 5 mm. The supply hole 65 opens at the position on the respective retainer 64 between two rows of the cylindrical rollers 63.

In the present embodiment, a groove 65b communicating to the supply hole 65 is provided in the axially central portion on the outer peripheral surface of the outer ring to facilitate the shooting of the grease G into the supply hole 65. However, the groove 65b may be omitted. The rolling bearings shown in FIGS. 1 to 5 may have a groove formed on the outer peripheral surface of the outer ring.

The space of the cylindrical roller bearing 60 is initially filled with the grease in an amount of from 8% to 15% of the volume of the space of the bearing. In operation, the bearing is supplied with the grease in the following manner. In some detail, the grease G is shot through the supply hole 65 at a proper timing (intermittently or regularly) in such an amount that the amount of the grease to be supplied at a time is from 0.1% to 4% of the volume of the space of the bearing.

The grease G which has been shot toward the retainer 64 is uniformly spread over the periphery of the races of the inner and outer rings as the bearing rotates. Thus, a new oil film is formed by the grease G thus shot. When the running-in operation ends, the grease other than minimum requirement is caught and discharged out of the rolling surface to form a bank. A slight amount of the base oil leaks from the grease thus accumulated to lubricate the rolling surface or the guiding surface of the retainer.

Figure 8:
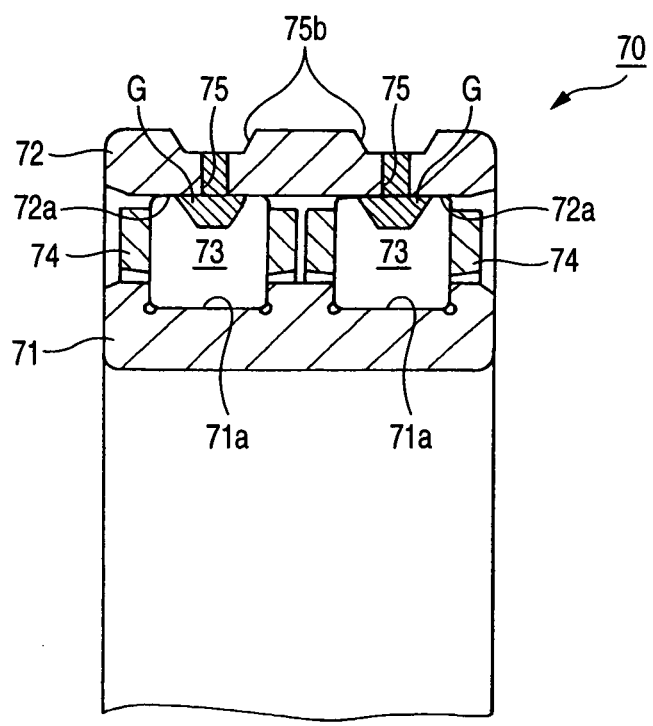
FIG. 8 is a sectional view illustrating the seventh embodiment of the invention.

The double-row cylindrical roller bearing 70 according to the seventh embodiment of the invention shown in FIG. 8 includes an inner ring 71, an outer ring 72, a plurality of cylindrical rollers 73 arranged in two rows between an inner ring race 71a of the inner ring 71 and an outer ring race 72a of the outer ring 72, and a retainer 74 for retaining the cylindrical rollers 73 in the respective rows peripherally at regular intervals.

In the present embodiment, the outer ring 72 has supply holes 75 formed by numbers (two in this case) as viewed axially as a supplying element extending radially through the outer ring 72. The supply hole 75 opens toward the rolling surface of the respective rows of the cylindrical rollers 73. The outer ring has two rows of grooves 75b formed on the outer peripheral surface thereof.

Figure 9:
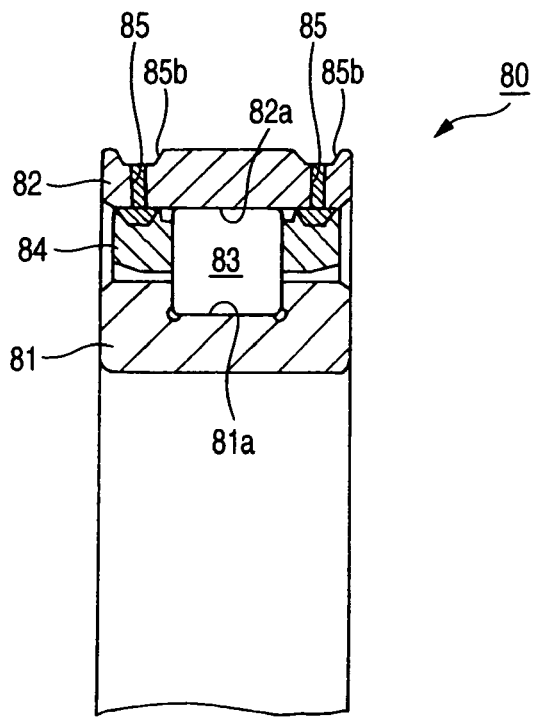
FIG. 9 is a sectional view illustrating the eighth embodiment of the invention.

The single-row cylindrical roller bearing 80 according to the eighth embodiment of the invention shown in FIG. 9 includes an inner ring 81, an outer ring 82, a plurality of cylindrical rollers 83 disposed between the inner ring race 81a of the inner ring 81 and an outer ring race 82a of the outer ring 82, and a retainer 84 being guided by the outer ring.

In the present embodiment, the outer ring 82 has two supply holes 85 as supplying elements as viewed axially, the supply hole 85 extending radially through the outer ring 82. The respective supply holes 85 each opens toward the guiding surface of the retainer 84 disposed on the axially both sides of the cylindrical roller 83. The outer ring has two rows of grooves 85b formed on the outer peripheral surface thereof.

Though not shown, the supply hole 85 may be provided by a number of one as viewed axially to open toward one side of the guiding surfaces of the retainer.

Figure 10:
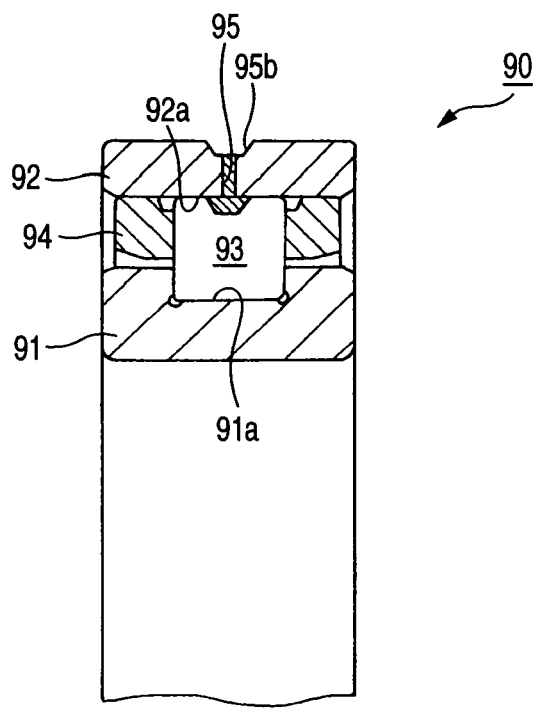
FIG. 10 is a sectional view illustrating the ninth embodiment of the invention.

The single-row cylindrical roller bearing 90 according to the ninth embodiment of the invention shown in FIG. 10 includes an inner ring 91, an outer ring 92, a plurality of cylindrical rollers 93 disposed between an inner ring race 91a of the inner ring 91 and an outer ring race 92a of the outer ring 92, and a retainer 94 being guided by the outer ring.

In the present embodiment, the outer ring 92 has a supply hole 95 formed on the axially central portion thereof as a supplying element extending radially through the outer ring 92. The supply hole 95 opens toward the rolling surface of the cylindrical roller 93. The outer ring has a groove 95b formed on the axially central portion of the outer peripheral surface thereof.

Figure 11:
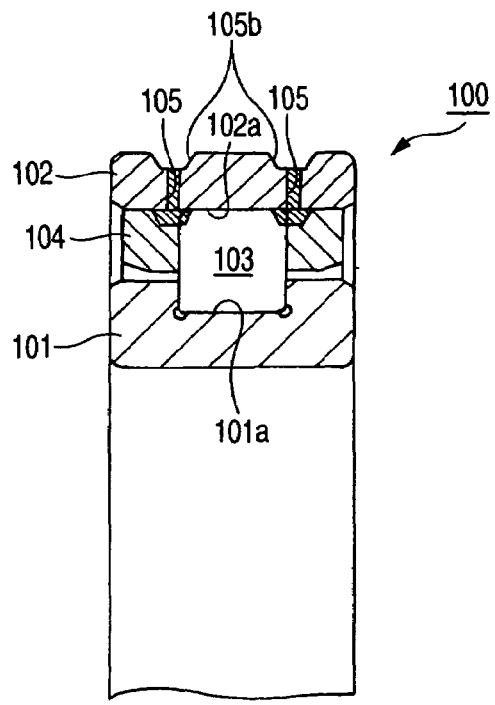
FIG. 11 is a sectional view illustrating the tenth embodiment of the invention.

The single-row cylindrical roller bearing 100 according to the tenth embodiment of the invention shown in FIG. 11 includes an inner ring 101, an outer ring 102, a plurality of cylindrical rollers 103 disposed between an inner ring race 101a of the inner ring 101 and an outer ring race 102a of the outer ring 102, and a retainer 104 being guided by the outer ring.

In the present embodiment, the outer ring 102 has supply holes 105 formed by a number of two as viewed axially as a supplying element extending radially through the outer ring 102. The respective supply holes 105 each open at the position between the axial ends of the cylindrical roller 103 and the guiding surface of the retainer 104. The outer ring 102 has two rows of grooves 105b formed on the outer peripheral surface thereof.

Though not shown, the supply hole may be provided by a number of 1 as viewed axially.

Figure 12:
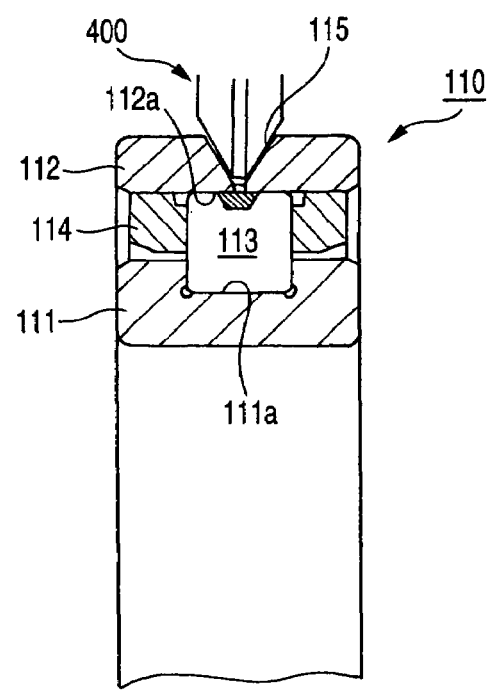
FIG. 12 is a sectional view illustrating the eleventh embodiment of the invention.

The single-row cylindrical roller bearing 110 according to the eleventh embodiment of the invention shown in FIG. 12 includes an inner ring 111, an outer ring 112, a plurality of cylindrical rollers 113 disposed between an inner ring race 111a of the inner ring 111 and an outer ring race 112a of the outer ring 112, and a retainer 114 being guided by the outer ring.

In the present embodiment, the outer ring 112 has a supply hole 115 formed on the axially central portion thereof as a supplying element extending radially through the outer ring 112. The supply hole 115 is tapered according to the forward tapered end of a nozzle 400 for shooting the grease and thus decreases in its diameter toward the interior of the outer ring 112. In other words, the supply hole 115 has a conical space. The supply hole 115 opens toward the rolling surface of the cylindrical roller 113.

Using a cylindrical roller bearing having a form shown in FIG. 10, the following experiment was made.

(Experiment 3)

A plurality of cylindrical roller bearings having an inner diameter of 95 mm, an outer diameter of 145 mm and a bearing space volume of 31 cm$^3$ and comprising 27 rollers each having a diameter of 11 mm and a length of 11 mm which are each supplied with Isoflex NBU15 as a grease in such a manner that the amount of the grease to be initially filled is 10% of the volume of the space of the bearing were prepared. These cylindrical roller bearings were then subjected to running-in operation. The temperature of the outer ring at 9,000 min$^{-1}$ after the running-in operation was 35° C. Thereafter, these bearings were each supplied with the grease in respective predetermined amounts. The rotary speed was then raised from 0 to 9,000 min$^{-1}$ in 2 seconds. The temperature of the outer ring was then measured. This experimental procedure was conducted five times (n1 to n5).

Figure 13:
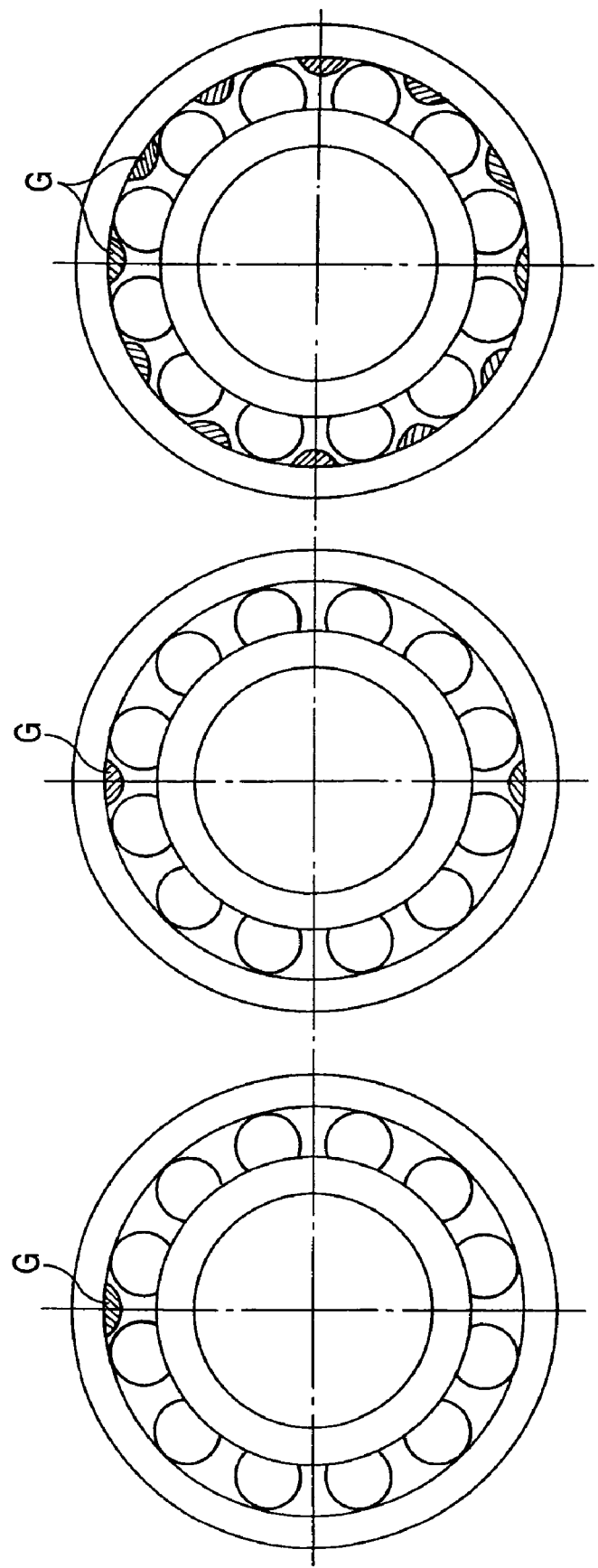
FIG. 13 is a side view illustrating a modification of an embodiment of the invention.

The results of the experiment involving the supply of the grease G through only one supply hole as shown in FIG. 13a are set forth in Table 3 below.

TABLE 3

| Supplied amount | n1 | n2 | n3 | n4 | n5 |
|---|---|---|---|---|---|
| 2% | E | E | E | E | E |
| 4% | E | F | E | G | G |
| 6% | G | F | P | G | G |
| 10% | P | P | P | P | F |

In Table 3 above, E (excellent) indicates that the temperature of the outer ring was not higher than 40° C., G (good) indicates that the temperature of the outer ring was not higher than 50° C., F (fair) indicates that the temperature of the outer ring was not greater than 60° C., and P (poor) indicates that the temperature of the outer ring was higher than 60° C.

The results of the experiment involving the supply of the grease G through the supply hole disposed at two opposing positions (departed from each other by 180°) as shown in FIG. 13b are set forth in Table 4 below.

TABLE 4

| Supplied amount | n1 | n2 | n3 | n4 | n5 |
|---|---|---|---|---|---|
| 2% | E | E | E | E | E |
| 4% | E | E | E | E | E |
| 6% | F | E | G | G | G |
| 10% | F | P | P | G | F |

The results of the experiment involving the supply of the grease G through the supply hole disposed at all the gaps between the rollers as shown in FIG. 13c are set forth in Table 5 below.

TABLE 5

| Supplied amount | n1 | n2 | n3 | n4 | n5 |
|---|---|---|---|---|---|
| 2% | E | E | E | E | E |
| 4% | E | E | E | E | E |
| 6% | G | E | F | E | E |
| 10% | G | F | F | P | F |

As can be seen in Tables 3 to 5, when the supplied amount of the grease was not greater than 2%, the bearing showed no abnormal temperature rise upon rotation after the supply of the grease.

When the supplied amount of the grease was 4%, abnormal temperature was remarkably inhibited by increasing the number of supplying positions. It was found that even when the same amount of the grease is supplied, abnormal temperature rise can be better inhibited by shooting the grease through the supply hole disposed at a plurality of positions arranged peripherally on the outer ring at regular intervals.

When the supplied amount of the grease exceeded 4%, there occurred a temperature dispersion that caused instability even if the number of grease supplying positions is increased.

(Experiment 4)

In the embodiment shown in FIG. 10, two cylindrical roller bearings were prepared having an inner diameter of 70 mm, an outer diameter of 110 mm and a bearing space volume of 2.4 cm$^3$ and comprising 20 rollers each having a diameter of 9 mm and a length of 9 mm and retainers made of PEEK (polyether ether ketone being carbon fiber-reinforced grade) being guided by the outer ring at both sides thereof which are each supplied with Isoflex NBU15 as a grease in such a manner that the amount of the grease to be initially filled is 10% of the volume of the space of the bearing. Both the two cylindrical roller bearings were rotated at a speed of 16,500 min$^{-1}$ (dmN: 1,500,000). One of the two cylindrical roller bearings was supplied with the grease in an amount of 2% of the volume of the space of the bearing after 48 hours from the starting of rotation. The other cylindrical roller bearing was not supplied with the grease. Subsequently, both the two cylindrical roller bearings were rotated at a speed of 16,500 min$^{-1}$(dmN:1,500,000). The durability life was then measured.

The cylindrical roller bearing which had been supplied with the grease attained the desired durability life of 1,000 hours while the cylindrical roller bearing which had not be supplied with the grease attained a durability life of only 200 hours.

Figure 14:
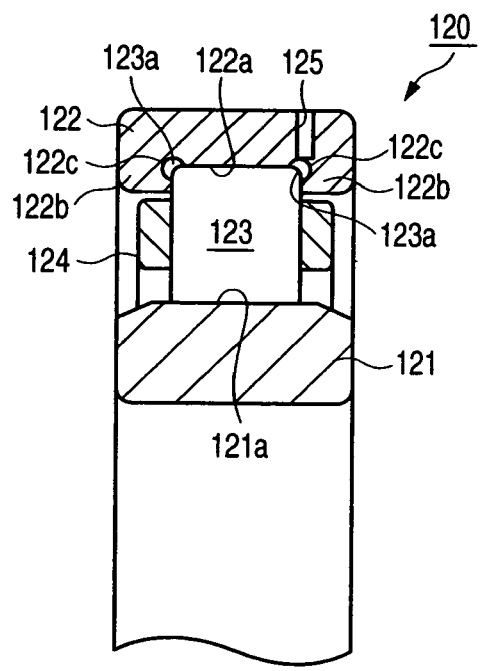
FIG. 14 is a sectional view illustrating the twelfth embodiment of the invention.

The single-row cylindrical roller bearing 120 according to the twelfth embodiment of the invention shown in FIG. 14 includes an inner ring 121, an outer ring 122 having two ribs 122b, cylindrical rollers 123 disposed between an inner ring race 121a of the inner ring 121 and an outer ring 122a of the outer ring 122, and a retainer 124 being guided by the outer ring.

The cylindrical rollers 123 are rollably arranged along the outer ring race 122a formed between the ribs 122b on the inner peripheral surface of the outer ring 122 and the inner ring race 121a formed on the outer peripheral surface of the inner ring 121. The outer ring race 122a has a relief portion 122c formed as an indented portion at the positions opposed to the edge portion 123a of the cylindrical roller 123 to give a structure for avoiding interference with the edge portion 123a.

In the present embodiment, the outer ring 122 has a supply hole 125 formed as a supplying element extending radially through the outer ring 122 and communicating to one of the two relief portions 122c of the outer ring 122. The grease is additionally supplied radially into the relief portion 122c in the rolling bearing 120 from the outside through the supply hole 125. As the cylindrical roller 123 rotates, the additional grease which has thus been supplied extends all over the entire surface of the interior of the bearing to make up for the insufficiency of grease. Thus, the damage on the bearing due to the insufficiency of grease can be prevented, making it possible to prolong the lifetime of the bearing.

Figure 15:
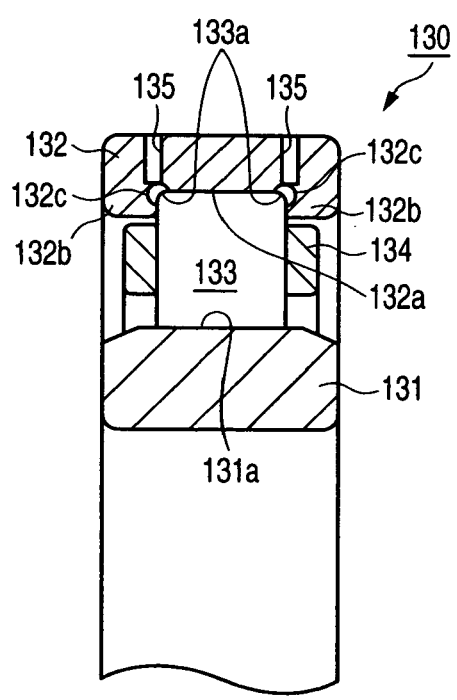
FIG. 15 is a sectional view illustrating the thirteenth embodiment of the invention.

The single-row cylindrical roller bearing 130 according to the thirteenth embodiment of the invention shown in FIG. 15 includes an inner ring 131, an outer ring 132 having two ribs 132b, two cylindrical rollers 133 disposed between an inner ring race 131a of the inner ring 131 and an outer ring race 132a of the outer ring 132, and a retainer 134 being guided by the outer ring.

The cylindrical rollers 133 are rollably arranged along the outer ring race 132a formed between the ribs 132b on the inner peripheral surface of the outer ring 132 and the inner ring race 131a formed on the outer peripheral surface of the inner ring 131. The outer ring race 132a has a relief portion 132c formed as an indented portion on the both sides thereof at the positions opposed to the edge portion 133a of the cylindrical roller 133 to give a structure for avoiding interference with the edge portion 133a.

In the present embodiment, the outer ring 132 has two supply holes 135 formed as a supplying element radially extending through the outer ring 132 and communicating to the respective relief portion 132c of the outer ring 132. The grease is additionally supplied radially into the relief portion 132c in the rolling bearing 130 from the outside through the supply holes 135. As the cylindrical roller 133 rotates, the additional grease which has thus been supplied extends all over the entire surface of the interior of the bearing to make up for the insufficiency of grease. Thus, the damage on the bearing due to the insufficiency of grease can be prevented, making it possible to prolong the lifetime of the bearing.

Figure 16:
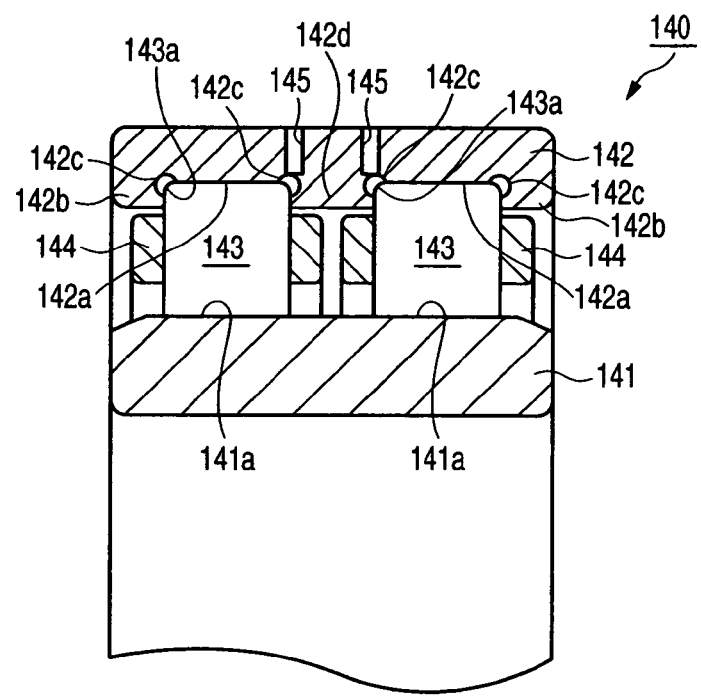
FIG. 16 is a sectional view illustrating the fourteenth embodiment of the invention.

The double-row cylindrical roller bearing 140 according to the fourteenth embodiment of the invention shown in FIG. 16 includes an inner ring 141, an outer ring 142, cylindrical rollers 143 disposed between an inner ring race 141a of the inner ring 141 and an outer ring race 142a of the outer ring 142, and a retainer 144 being guided by the outer ring.

The outer ring 142 has two ribs 142b formed on both the axial ends thereof and a rib 142d formed on the central portion of the inner peripheral surface thereof. Two outer ring races 142a are formed between the two ribs 142b and the rib 142d, respectively.

The two cylindrical rollers 143 are rollably arranged along the two outer ring races 142a and the inner ring races 141a formed on the inner ring 141, respectively. The outer ring 142 has relief portions 142c formed as an indented portion on both the sides of the outer ring races 142a at the position opposed to the edge portion 143a of the cylindrical rollers 143 to give a structure for avoiding the interference with the edge portion 143a.

In the present embodiment, the outer ring 142 has two supply holes 145 formed as a supplying element radially extending through the outer ring 142 and communicating to one of the relief portions 142c provided on both the ends of the respective outer ring race 142a. The additional grease is supplied radially into the relief portion 142c in the rolling bearing 140 from the outside through the supply hole 145. As the cylindrical roller 143 rotates, the additional grease which has thus been supplied extends all over the entire surface of the interior of the bearing to makeup for the insufficiency of grease. Thus, the damage on the bearing due to the insufficiency of grease can be prevented, making it possible to prolong the lifetime of the bearing.

Figure 17:
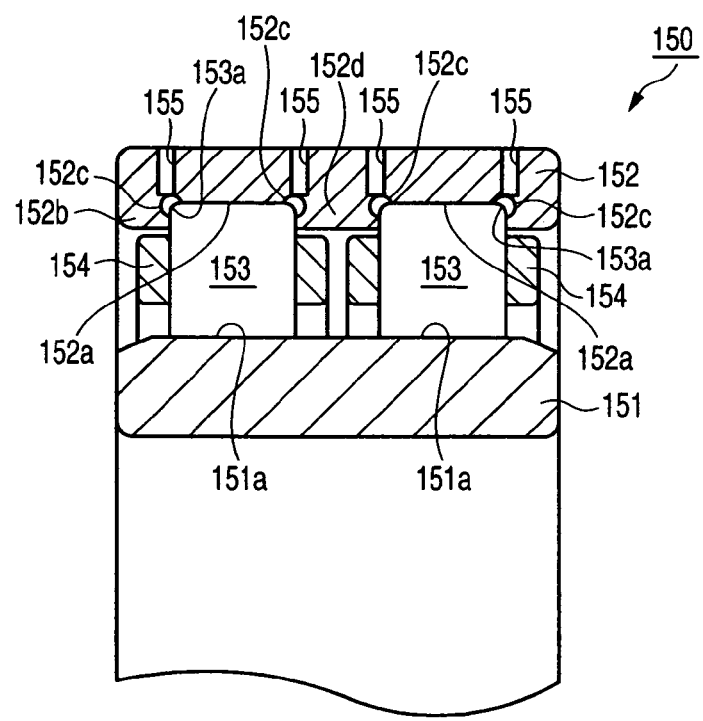
FIG. 17 is a sectional view illustrating the fifteenth embodiment of the invention.

The double-row cylindrical roller bearing 150 according to the fifteenth embodiment of the invention shown in FIG. 17 includes an inner ring 151, an outer ring 152, cylindrical rollers 153 disposed between an inner ring race 151a of the inner ring 151 and an outer ring race 152a of the outer ring 152, and a retainer 154 being guided by the outer ring.

The outer ring 152 has two ribs 152b formed on both the axial ends thereof and a rib 152d formed on the central portion of the inner peripheral surface thereof. Two outer ring races 152a are formed between the ribs 152b and the rib 152d, respectively.

The two cylindrical rollers 153 are rollably arranged along the two outer ring races 152a and the inner ring races 151a formed on the outer peripheral surface of the inner ring 151. The outer ring 152 has relief portions 152c formed as an indented portion on both the sides of the outer ring races 152a at the position opposed to the edge portion 153a of the cylindrical rollers 153 to give a structure for avoiding the interference with the edge portion 153a.

In the present embodiment, the outer ring 152 has four supply holes 155 formed as a supplying element radially extending through the outer ring 152 and communicating to the relief portions 152c provided on both the ends of the respective outer ring race 152a. The additional grease is supplied radially into the relief portion 152c in the rolling bearing 150 from the outside through the supply hole 155. As the cylindrical roller 153 rotates, the additional grease which has thus been supplied extends all over the entire surface of the interior of the bearing to make up for the insufficiency of grease. Thus, the damage on the bearing due to the insufficiency of grease can be prevented, making it possible to prolong the lifetime of the bearing.

Figure 18:
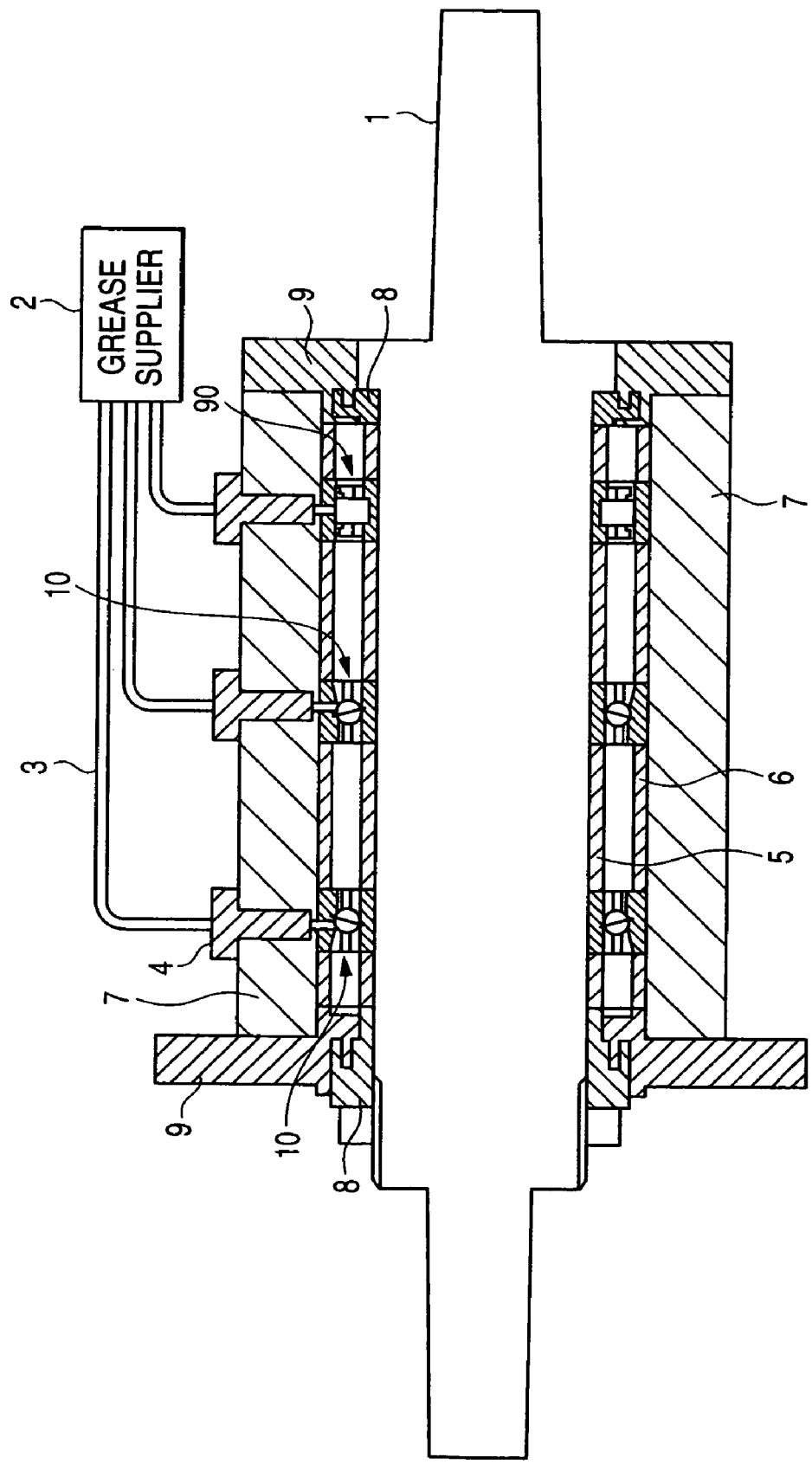
FIG. 18 is a sectional view illustrating a spindle device formed by the rolling bearings described in the first to fifteenth embodiments of implementation of the invention.

FIG. 18 is a diagram illustrating a spindle device for machine tools including a rolling bearing as described in the first to fifteenth embodiments of implementation of the invention. In this drawing, an angular contact ball bearing 10 according to the first embodiment of the invention and a cylindrical roller bearing 90 according to the ninth embodiment of the invention are used by way of example. The spindle device FIG. 18 is formed by different types of bearings by way of example but may be formed by only one type of bearings.

The bearings 10 and 90 are fitted on a spindle 1 and fitted in a housing 7. The spindle 1 can rotate relative to the housing 7 via the bearings 10 and 90. Inner ring spacers 5 and outer ring spacers 6 disposed along the spindle 1 and the housing 7 are disposed between the inner rings and outer rings of the bearings 10 and 90. The inner ring spacers 5 and the outer ring spacers 6 have an inner ring holding member 8 and an outer ring holding member 9 disposed on the both axial ends thereof, respectively, so that a preload is applied to the respective bearings through the respective spacers. A gap which is not shown is formed between the inner ring holding member 8 and the outer ring holding member 9. A labyrinth is formed between the two holding members.

The housing 7 has nozzles (grease supplying shuttles) 4 fixed thereto and extending through the housing 7 for supplying the additional grease into a supply hole formed in the outer ring of the bearings 10 and 90. The grease is supplied from a grease supplier 2 through feed pipes 3 into the nozzles 4 through which it is then radially injected into the interior of the bearings. The grease supplier 2 shoots the grease at a proper timing (intermittently or regularly) in an amount of from 0.1 to 4% of the volume of the space of the bearing at a time.

In FIG. 18, the bearing 10 according to the first embodiment of the invention and the bearing 90 according to the ninth embodiment of the invention are used by way of example. Of course, bearings according to the second to eighth embodiments of implementation of the invention or the tenth to fifteenth embodiments of implementation of the invention maybe used singly or in combination.

It goes without saying that the similar effect can be expected also when the outer ring of other bearings are provided with the similar supply holes.

Figure 19:
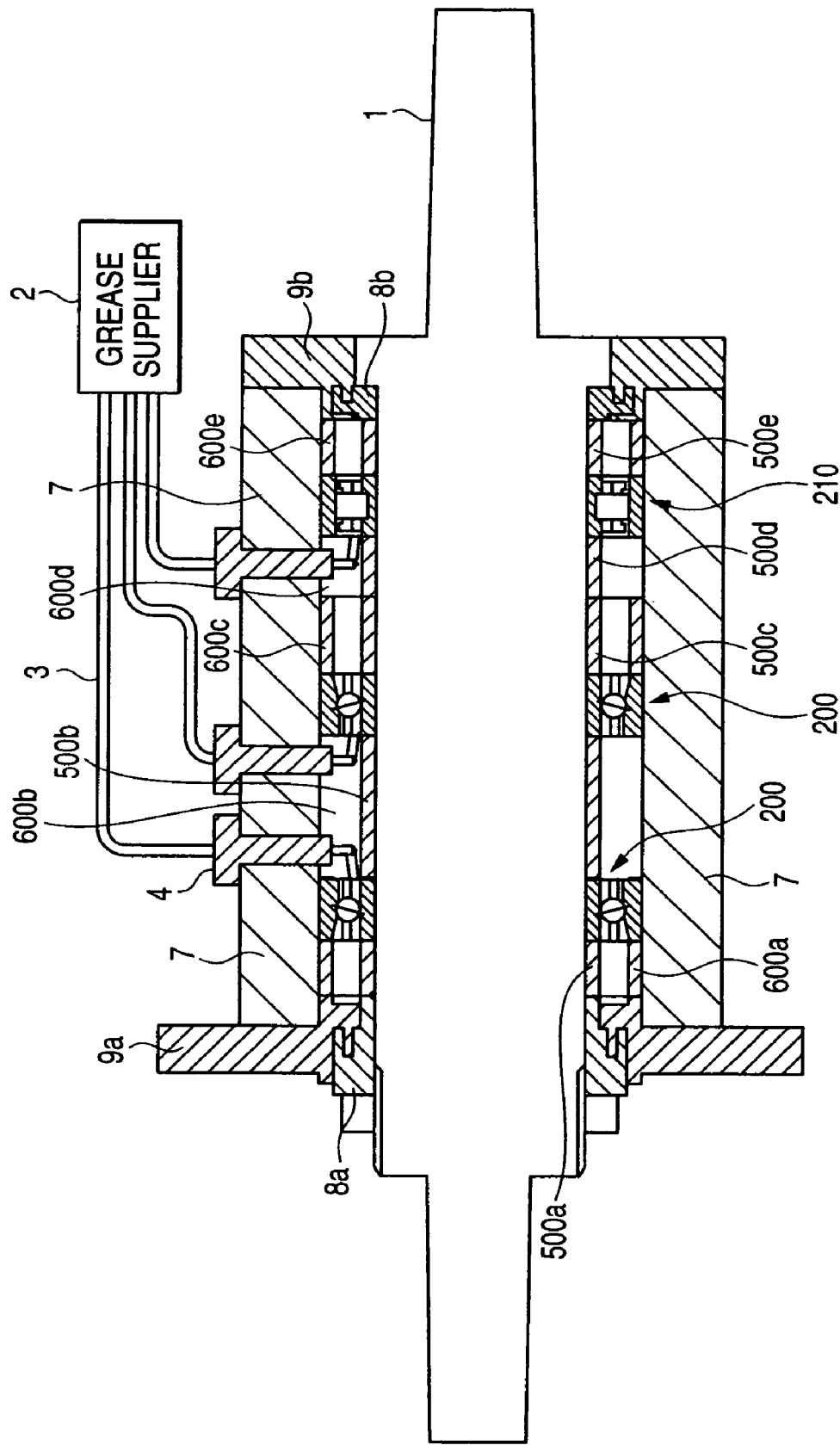
FIG. 19 is a sectional view illustrating a spindle device formed by the rolling bearings described in the sixteenth to seventeenth embodiments of implementation of the invention.

FIG. 19 is a diagram illustrating a spindle device for machine tools comprising rolling bearings 200 and 210 according to the sixteenth and seventeenth embodiments of implementation of the invention. The spindle device of FIG. 19 is shown formed by different types of bearings by way of example but may be formed by only one type of bearings.

The bearings 200 and 210 are fitted on a spindle 1 and fitted in a housing 7. The spindle 1 can rotate relative to the housing 7 via the bearings 200 and 210. Between the respective inner rings and outer rings of the bearings 200 and 210 are disposed inner ring spacers 500a, 500b, 500c, 500d and 500e and outer ring spacers 600a, 600b, 600c, 600d and 600e disposed along the spindle 1 and the housing 7 in this order from left to right as viewed on the drawing.

The inner ring spacers 500a and 500e and the outer ring spacers 600a and 600e have inner ring holding members 8a and 8b and outer ring holding members 9a and 9b disposed on the both axial ends thereof, respectively. A preload is applied to the respective bearings through the respective spacers. A gap which is not shown is formed between the inner ring holding member 8a and the outer ring holding member 9a and between the inner ring holding member 8b and the outer ring holding member 9b. A labyrinth is formed between the two holding members.

Figure 20:
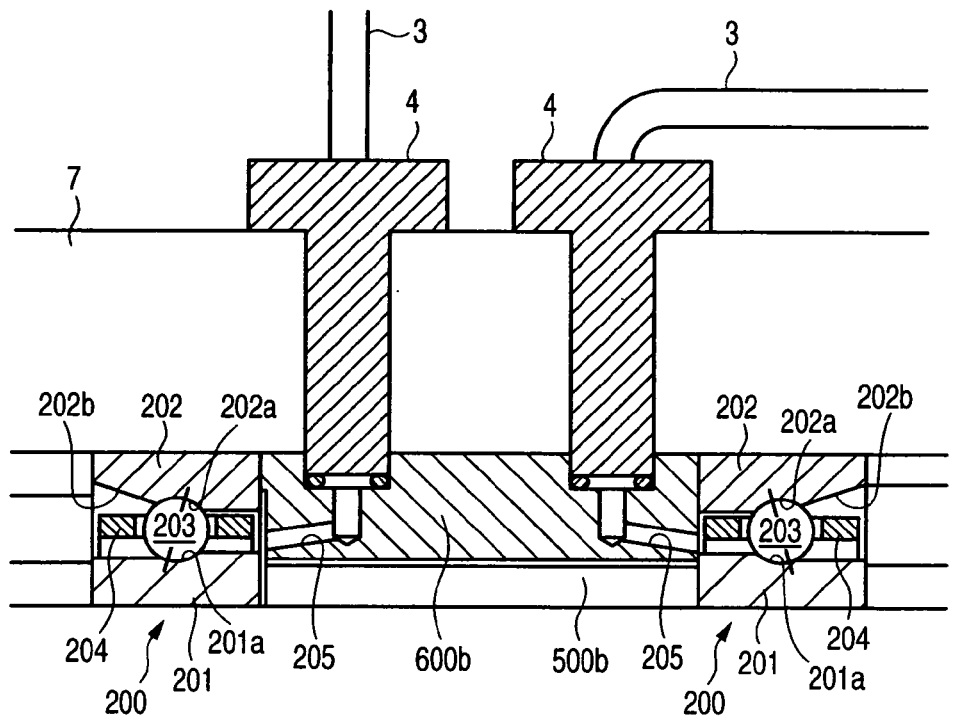
FIG. 20 is an enlarged sectional view of the spindle device shown in FIG. 19 illustrating the sixteenth embodiment of the invention.

FIG. 20 is an enlarged sectional view of the spindle device shown in FIG. 19. An angular contact ball bearing 200 according to the sixteenth embodiment of the invention and its peripheral structure will be described hereinafter.

The respective angular contact ball bearings 200 shown in FIG. 20 each includes an inner ring 201, an outer ring 202, a plurality of balls 203 disposed between an inner ring race 201a of the inner ring 201 and an outer ring 202a of the outer ring 202, and a retainer 204 for retaining the balls 203 peripherally at regular intervals. The outer ring 202 has a tapered portion 202b for retaining the balls 203 at a certain angle of contact on one axial end thereof. The one axial end at which the tapered portion is formed will be hereinafter referred to as "front side" and the other will be hereinafter referred to as "back side".

In the present embodiment, the respective angular contact ball bearings 200 have a grease supplying outer ring spacer 600b disposed therebetween. Two grease supplying nozzles 4 extending through the housing 7 are inserted into and fixed to the grease supplying outer ring spacer 600b. The grease supplying nozzles 4 are additionally supplied with the grease from an external grease supplier 2 through a feed pipe 3.

The grease supplying outer ring spacer 600b has a supply hole 205 as a supplying element for supplying the additional grease from the forward end of the nozzle 4 into the interior of the angular contact ball bearing 200. The supply hole 205 has a circular section having a diameter of from 0.1 mm to 5 mm and opens toward the interior of the bearing 200 (radially inside the retainer 204). The supply hole 205 supplies the additional grease into the gap between the inner ring 201 and the outer ring 202 from the back side. The grease thus supplied extends mainly to the inner diameter side of the retainer 204.

The supply hole 205 may be provided at a plurality of positions on the grease supplying outer ring spacer 600b at radial intervals. The grease thus supplied preferably extends mainly to the inner diameter side of the retainer 204 but may extend to the outer diameter side of the retainer 204.

The space of respective angular contact ball bearings 200 are each are initially filled with the grease in an amount of from 10% to 20% of the volume of the space of the bearing. After the beginning of operation of bearing, the grease supplier 2 shoots the grease through the supply hole 205 in an amount of from 0.1% to 4% of the volume of the space of the bearing at a time at a proper timing (intermittently or regularly). As the balls 203 roll, the grease which has thus been additionally supplied into the interior of the bearing extends to the entire surface of the interior of the bearing to make up for the insufficiency of grease. Thus, the damage on the bearing due to the insufficiency of grease can be prevented, making it possible to prolong the lifetime of the bearing.

Figure 21:
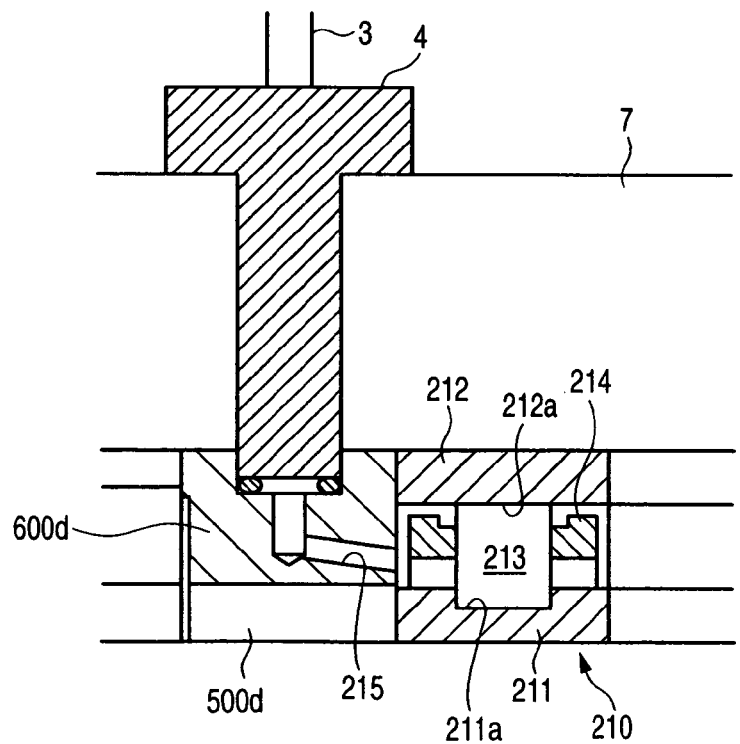
FIG. 21 is an enlarged sectional view of the spindle device shown in FIG. 19 illustrating the seventeenth embodiment of the invention.

FIG. 21 is an enlarged view of the spindle device shown in FIG. 19. The single-row cylindrical roller bearing 210 according to the seventeenth embodiment of the invention will be described hereinafter.

The single-row cylindrical roller bearing 210 includes an inner ring 211, an outer ring 212, cylindrical rollers 213 disposed between an inner ring race 211a of the inner ring 211 and an outer ring race 212a of the outer ring 212, and a retainer 214 for retaining the rollers 213 peripherally at regular intervals.

In the present embodiment, a grease supplying outer ring spacer 600d is disposed axially adjacent to the cylindrical roller 210. A grease supplying nozzle 4 extending through the housing 7 is inserted into and fixed to the grease supplying outer ring spacer 600d. The additional grease is supplied from an external grease supplier 2 into the grease supplying nozzle 4 through a feed pipe 3.

The grease supplying outer ring spacer 600d has a supply hole 215 formed therein as a supplying element for additionally supplying the grease from the forward end of the nozzle 4 into the interior of the bearing 210. The supply hole 215 has a circular section having a diameter of from 0.1 mm to 5 mm and opens toward the interior of the bearing 210 (radially inside the retainer 214). The supply hole 215 supplies the additional grease into the gap between the inner ring 2111 and the outer ring 212 from the back side. The grease thus supplied extends mainly to the inner diameter side of the retainer 214.

The supply hole 215 may be provided at a plurality of positions on the grease supplying outer ring spacer 600d at radial intervals. The grease thus supplied preferably extends mainly to the inner diameter side of the retainer 214 but may extend to the outer diameter side of the retainer 214.

The each space of angular contact ball bearings 210 is initially filled with the grease in an amount of from 10% to 20% of the volume of the space of the bearing. After the beginning of operation of bearing, the grease supplier 2 shoots the grease through the supply hole 215 in an amount of from 0.1% to 4% of the volume of the space of the bearing at a time at a proper timing (intermittently or regularly). As the cylindrical rollers 213 roll, the grease which has thus been additionally supplied into the interior of the bearing extends to the entire surface of the interior of the bearing to make up for the insufficiency of grease. Thus, the damage on the bearing due to the insufficiency of grease can be prevented, making it possible to prolong the lifetime of the bearing.

Figure 22:
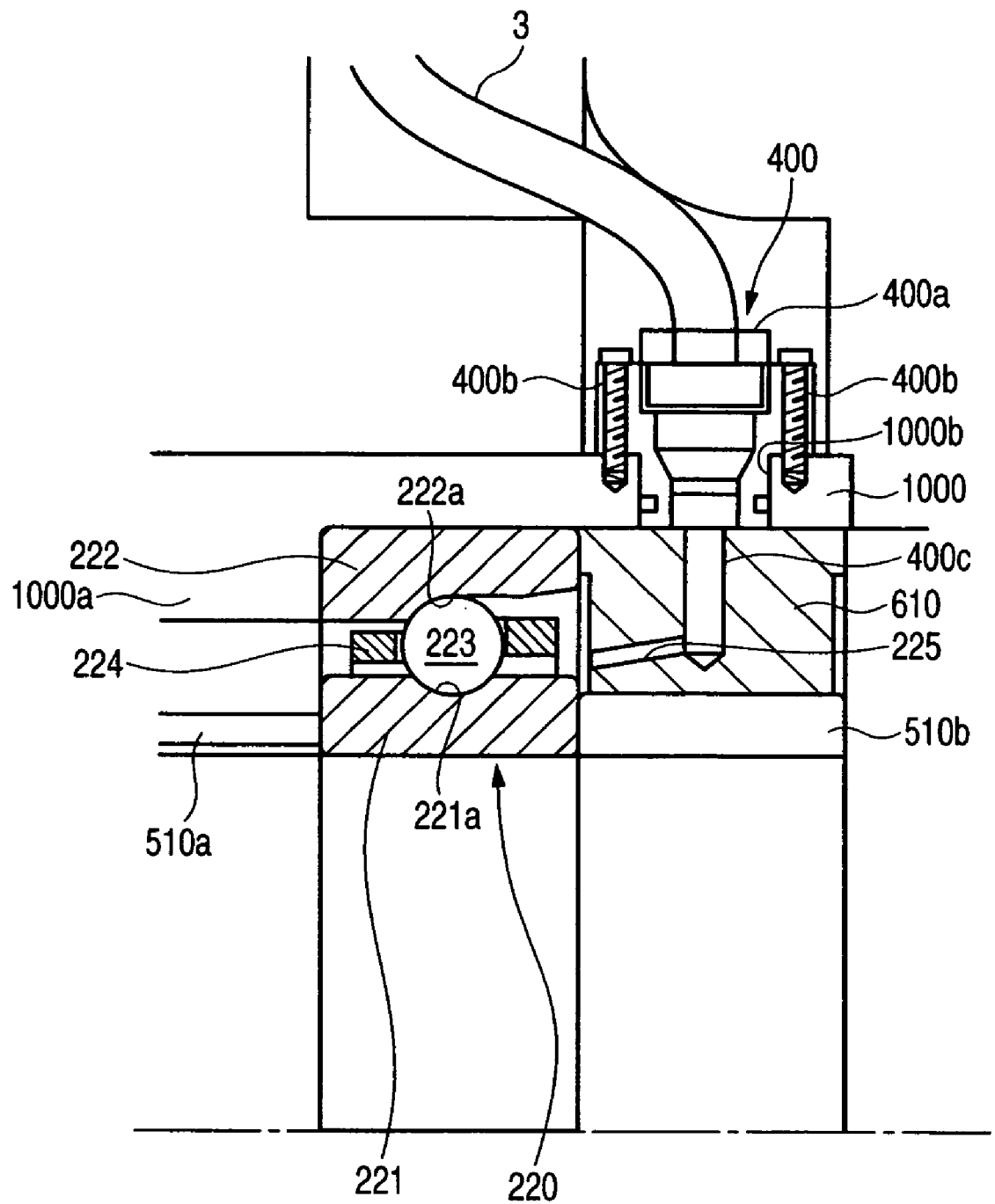
FIG. 22 is a sectional view illustrating the first modification of the sixteenth embodiment of the invention.

FIG. 22 is an enlarged view of the spindle device according to the first modification of the sixteenth embodiment of the invention.

The angular contact ball bearing 220 used in the present modification includes an inner ring 221 fitted on the shaft, an outer ring 222 fitted in the housing 1000, balls 223 rollably disposed between an inner ring race 221a of the inner ring 221 and an outer ring race 222a of the outer ring 222, and a retainer 224 for retaining the balls 223.

The housing 1000 has a raised portion 1000a extending inwardly and radially. The outer ring 222 of the bearing 220 comes in contact with the raised portion 1000a on the axially back side thereof. An inner ring spacer 510a is disposed on the axially back side of the inner ring 221 so as to be axially opposed to the raised portion 1000a.

On the other hand, a grease supplying outer ring spacer 610 is disposed on the axially front side of the outer ring 222. The grease supplying outer ring spacer 610 is radially opposed to the inner ring spacer 510b. The housing 1000 has an opening 1000b at the position thereof opposed to the outer peripheral surface of the grease supplying outer ring spacer 610 for allowing the grease supplying nozzle 400 to be inserted into the grease supplying outer ring spacer 610. The base portion 400a of the grease supplying nozzle 400 is fixed to the outer peripheral surface of the housing 1000 by a fastening member 400b such as thread. The forward end 400c extending from the base portion 400a is inserted into the interior of the grease supplying outer ring spacer 610.

The grease supplying outer ring spacer 610 has a supply hole 225 formed therein as a supplying element for additionally supplying the grease from the forward end 400c of the grease supplying nozzle 400 into the interior of the bearing 220. The supply hole 225 has a circular section having a diameter of from 0.1 mm to 5 mm. The supply hole 225 supplies the additional grease axially into the gap between the inner ring 221 and the outer ring 222 from the front side thereof. Thus, the damage on the bearing due to the insufficiency of grease can be prevented, making it possible to prolong the lifetime of the bearing.

The supply hole 225 may be provided at a plurality of positions on the grease supplying outer ring spacer 610 at radial intervals.

Figure 23:
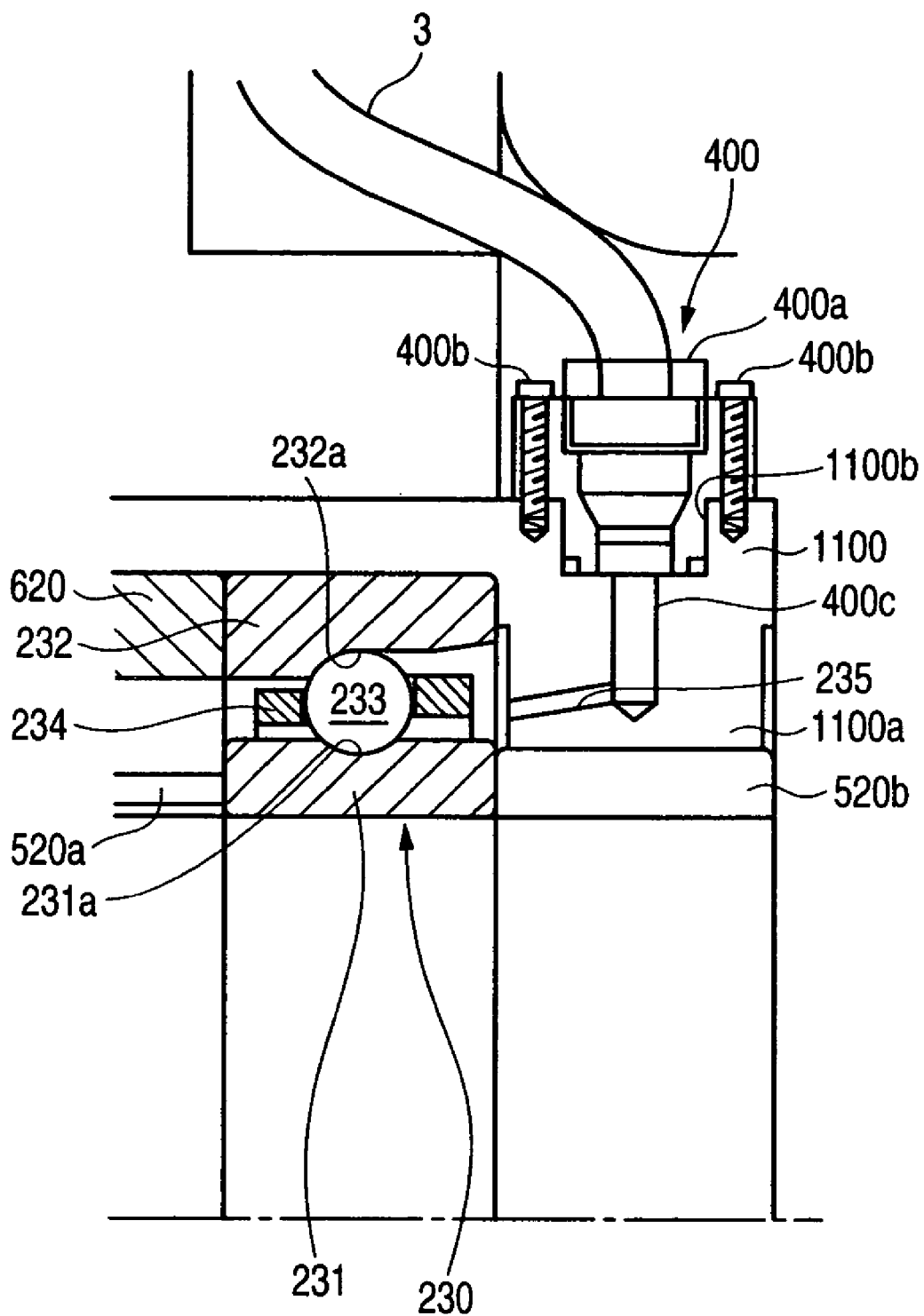
FIG. 23 is a sectional view illustrating the second modification of the sixteenth embodiment of the invention.

FIG. 23 is an enlarged sectional view of the spindle device according to the second modification of the sixteenth embodiment of the invention.

The angular contact ball bearing 230 used in the present modification includes an inner ring 231 fitted on the shaft, an outer ring 232 fitted in the housing 1100, balls 233 rollably disposed between an inner ring race 231a of the inner ring 231 and an outer ring race 232a of the outer ring 232, and a retainer 234 for retaining the balls 233.

The housing 1100 has a raised portion 1100a extending inwardly and radially. The outer ring 232 of the bearing 230 comes in contact with the raised portion 1100a on the axially front side thereof an inner ring spacer 520b is disposed on the axially front side of the inner ring 231 so as to be radially opposed to the raised portion 1100a. On the other hand, on the axially back side of the outer ring 232 are disposed an inner ring spacer 520a and an outer ring spacer 620 which are disposed opposed to each other.

The housing 1000 has an opening 1100b formed on the outer peripheral surface thereof opposite to the raised portion 1100a for allowing the grease supplying nozzle 400 to be inserted into the interior of the raised portion 1100a. The base portion 400a of the grease supplying nozzle 400 is fixed to the outer peripheral surface of the housing 1100 by a fastening member 400b such as thread. The forward end 400c extending from the base portion 400a is inserted into the interior of the raised portion 1100a.

The raised portion 1100a has a supply hole 235 formed therein as a supplying element for additionally supplying the grease from the forward end 400c of the grease supplying nozzle 400 into the interior of the bearing 230. The supply hole 235 has a circular section having a diameter of from 0.1 mm to 5 mm. The supply hole 235 supplies the additional grease axially into the gap between the inner ring 231 and the outer ring 232 from the front side thereof. Thus, the damage on the bearing due to the insufficiency of grease can be prevented, making it possible to prolong the lifetime of the bearing.

The supply hole 235 may be provided at a plurality of positions on the raised portion 1100a at radial intervals.

Figure 24:
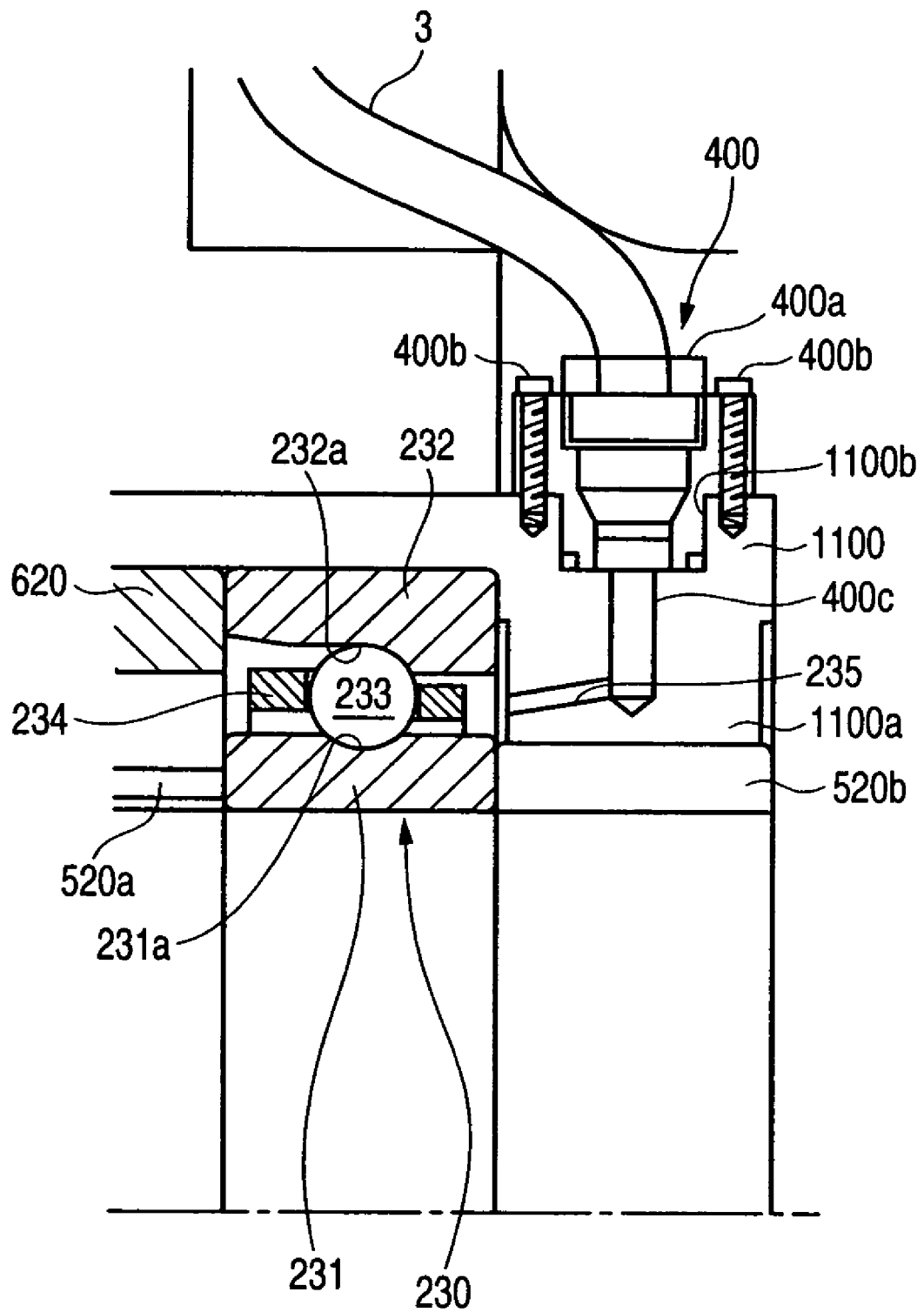
FIG. 24 is a sectional view illustrating the third modification of the sixteenth embodiment of the invention.

FIG. 24 is an enlarged sectional view of the spindle device according to the third modification of the sixteenth embodiment of the invention.

The present modification is obtained by exchanging the structures between the front side and the back side in the angular contact ball bearing according to the second modification of the invention. The raised portion 1100a of the housing 1100 is disposed toward the axially back side of the angular contact ball bearing 230. The other structures of the present embodiment are the same as shown in FIG. 23.

In the present modification, the additional grease is supplied axially into the gap between the inner ring 231 and the outer ring 232 from the back side thereof through the supply hole 235 formed in the raised portion 1100a. Thus, the damage on the bearing due to the insufficiency of grease can be prevented, making it possible to prolong the lifetime of the bearing.

Figure 25:
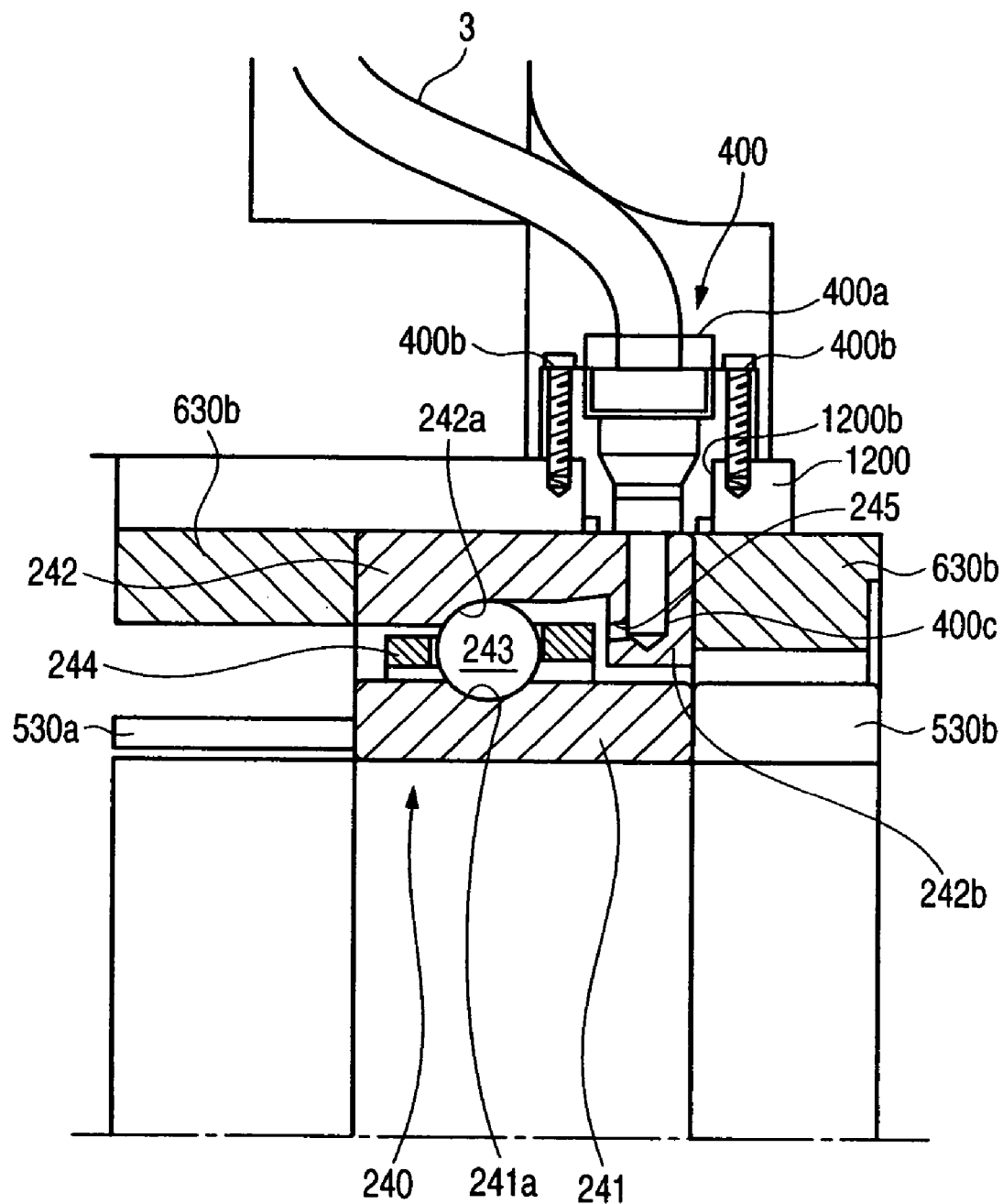
FIG. 25 is a sectional view illustrating the fourth modification of the sixteenth embodiment of the invention.

FIG. 25 is an enlarged sectional view of the spindle device according to the fourth modification of the sixteenth embodiment of the invention.

The angular contact ball bearing 240 used in the present modification includes an inner ring 241 fitted on the axis, an outer ring 242 fitted in the housing 1200, balls 243 rollably disposed between an inner ring race 241a of the inner ring 241 and an outer ring race 242a of the outer ring 242, and a retainer 244 for retaining the balls 243. The outer ring 242 has a raised portion 242b at the front end thereof extending inwardly and radially from the tapered portion.

The outer ring 242 of the bearing 240 i.e., raised portion 242b comes in contact with an outer ring spacer 630b on the axially front side thereof, and comes in contact with an outer ring spacer 630a on the axially back side thereof. The inner ring 231 has inner ring spacers 530a and 530b radially opposed to the outer ring spacers 630a and 630b on the back side and front side thereof, respectively.

The housing 1200 has an opening 1200b formed on the side thereof opposite to the raised portion 242b of the outer ring 242 for allowing the grease supplying nozzle 400 to be inserted into the interior of the raised portion 242b. The base portion 400a of the grease supplying nozzle 400 is fixed to the outer peripheral surface of the housing 1200 by a fastening member 400b such as thread. The forward end 400c extending from the base portion 400a is inserted into the interior of the raised portion 242b of the outer ring 242 through the opening 1200b.

The raised portion 242b has a supply hole 245 formed therein as a supplying element for additionally supplying the grease from the forward end 400c of the grease supplying nozzle 400 into the interior of the bearing 240. The supply hole 245 has a circular section having a diameter of from 0.1 mm to 5 mm. The supply hole 245 supplies the additional grease axially into the gap between the inner ring 241 and the outer ring 242 from the front side thereof. Thus, the damage on the bearing due to the insufficiency of grease can be prevented, making it possible to prolong the lifetime of the bearing.

The supply hole 245 may be provided at a plurality of positions on the raised portion 242b at radial intervals.

Figure 26:
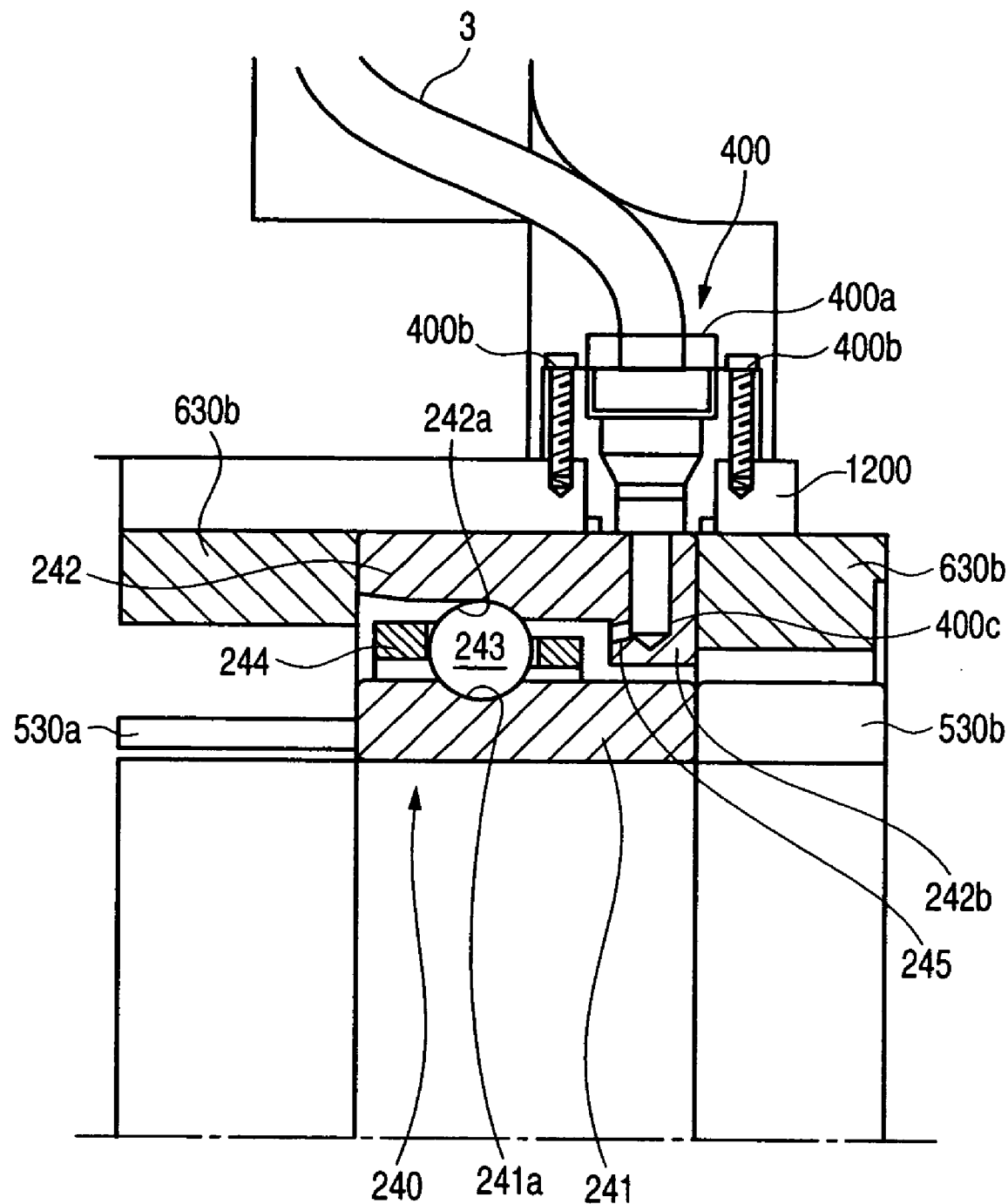
FIG. 26 is a sectional view illustrating the fifth modification of the sixteenth embodiment of the invention.

FIG. 26 is an enlarged sectional view of the spindle device according to the fifth modification of the present embodiment of the invention.

The present embodiment is an embodiment of the outer ring 242 of the angular contact ball bearing 240 according to the fourth modification. The raised portion 242b of the outer ring 242 is formed on the axially back side of the angular contact ball bearing 240. The other structures of the present embodiment are the same as shown in FIG. 25.

In the present embodiment, the grease which has thus been additionally supplied is then supplied axially into the gap between the inner ring 241 and the outer ring 242 from the back side thereof through a supply hole 245 formed in the raised portion 242b. Thus, the damage on the bearing due to the insufficiency of grease can be prevented, making it possible to prolong the lifetime of the bearing.

In the arrangement of the sixteenth and seventeenth embodiments and the first to fifth modifications of the sixteenth embodiment, the additional grease can be axially supplied into the interior of the bearing.

It goes without saying that the similar effect can be expected also when the outer ring of other bearings are provided with the similar supply holes.

(Experiment 5)

Figure 27:
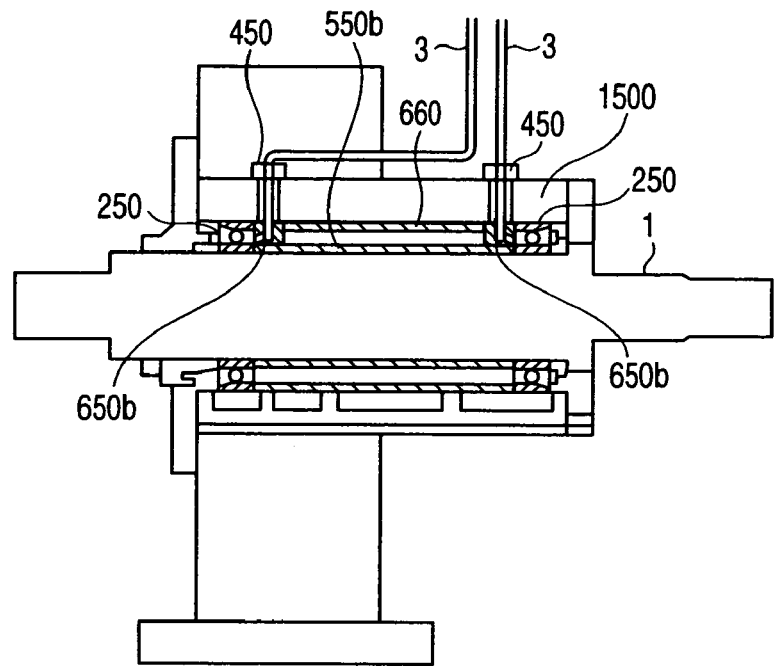
FIG. 27 is a diagram illustrating a rotary testing machine.

Using a rotary testing machine (intermediate S/P for 65 mm angular contact ball bearing) shown in FIG. 27, a durability test involving the additional supply of grease in the axial direction was conducted. In FIG. 27, the shaft 1 is configured rotatably relative to the housing 1500 via the angular contact ball bearings 250, 250 which are disposed back-to-back (DB).

Figure 28:
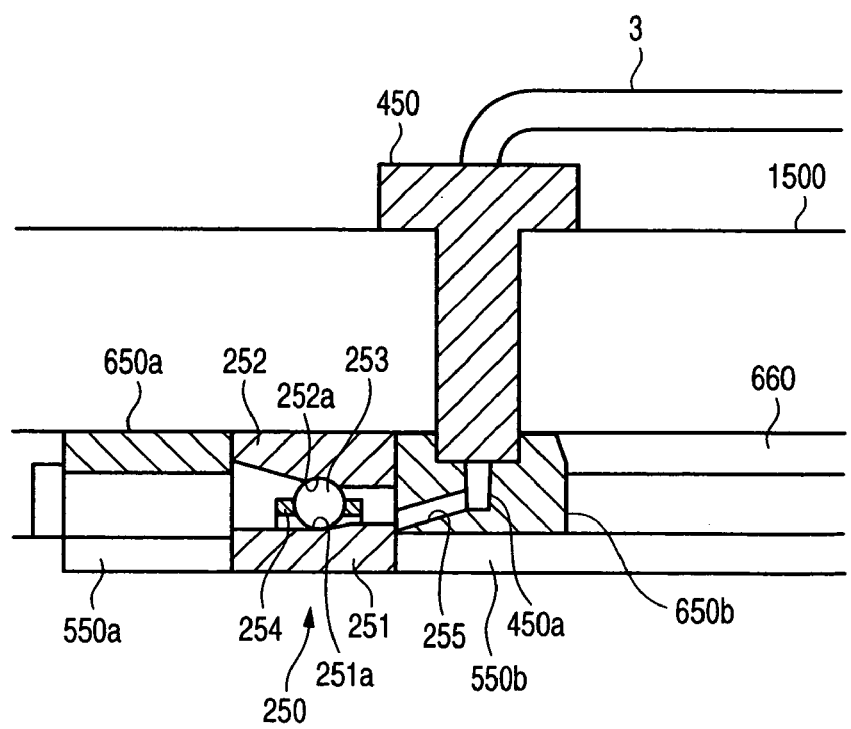
FIG. 28 is an enlarged view of the rotary testing machine of FIG. 27.

FIG. 28 is an enlarged view illustrating the angular contact ball bearing 250 of FIG. 27 and its peripheral members The angular contact ball bearing 250 includes an inner ring 251 fixed to the shaft 1, an outer ring 252 fixed to the housing, rolling elements 253 rollably disposed between an inner ring race 251a of the inner ring 251 and an outer ring race 252a of the outer ring 252, and a retainer 254 for retaining the rolling elements 253.

The respective angular contact ball bearings 250 each have an inner ring spacer 550a and an outer ring spacer 650a disposed adjacent to the inner ring 251 and the outer ring 252, respectively, on the front side thereof and an inner ring spacer 550b and a grease supplying outer ring spacer 650b disposed adjacent to the inner ring 251 and the outer ring 252, respectively, on the back side thereof. The grease supplying outer ring spacers 650b have an outer ring spacer 660 disposed therebetween.

A grease supplying nozzle 450 is inserted into and fixed to the grease supplying outer ring spacer 650b through the housing 1500. The grease is supplied into the grease supplying nozzle 450 from a grease supplier which is not shown through a feed pipe 3. The grease supplying outer ring spacer 650b has a supply hole 255 having a diameter of 2.0 mm which opens on the front side of the angular contact ball bearing 250. The grease which has, been supplied into the grease supplying nozzle. 450 is supplied from the forward end 450a into the supply hole 255 through which it is then supplied axially into the space of the bearing.

In the experiment, an angular contact ball bearing having an inner diameter of 65 mm, an outer diameter of 100 mm, a width of 18 mm and a contact angle of 18° and comprising balls having a diameter of 7.144 mm was used. The grease for use in lubrication was Isoflex NBU15. The initial amount of the grease to be filled was 15% of the volume of the space of the bearing. The two bearings 250, 250 each were rotated at a speed of 20,000 min$^{-1}$ (dmN: 1,800,000).

In the experiment, Experiment 1 free from the additional supply of grease and Experiment 2 involving the additional supply of grease were conducted for comparison. In Experiment 2, 0.3 cc (corresponding to 1.5% of the volume of the space of the bearing) of the grease was additionally shot into the space of the bearing through the supply hole 255 every 50 hours after the beginning of rotation.

As a result, in Experiment 1, the bearing showed seizing 500 hours after the beginning of the experiment. Thus, the experiment was suspended. On the other hand, in Experiment 2, no abnormalities occurred even after 3000 hours from the beginning of the experiment. Thus,the experiment ended without any problems. The results of these experiments show when supplied with the grease, the bearing showed no problems even after 3000 hours of operation. It was thus confirmed that the bearing of the invention exhibits a drastically prolonged lifetime.

As mentioned above, the invention provides a rolling bearing which can rotate at a high speed and exhibits a prolonged lifetime despite lubrication with grease by additionally supplying the grease before early deterioration of the grease causing damage on the bearing. The use of this rolling bearing makes it possible to realize a spindle device for machine tools having a high reliability.

While only certain embodiments of the invention have been specifically described herein, it will apparent that numerous modifications may be made thereto without departing from the spirit and scope of the invention.

What is claimed is:

1. A grease-lubricated rolling bearing comprising:
an outer ring having an outer ring race in an inner peripheral surface thereof;
an inner ring having an inner ring race on an outer peripheral surface thereof;
rolling elements rollably provided between the outer ring race and the inner ring race;
a grease supply element for supplying an additional grease in the rolling bearing; and
an outer ring spacer,
wherein the amount of the additional grease to be supplied at a time is predetermined to be from 0.1 to 4% of the volume of space in the bearing, and
wherein the grease supplying element is a supply hole provided in the outer ring spacer, and
wherein the diameter of the supply hole is from 0.1 mm to 5 mm.

2. The rolling bearing according to claim 1, wherein the supply hole extends in a radial direction of the rolling bearing.

3. The rolling bearing according to claim 1, wherein the supply hole extends in a substantially axial direction of the rolling bearing.

4. The rolling bearing according to claim 1, wherein the rolling element is a ball,
wherein the ball is disposed between the inner ring race of the inner ring and the outer ring race of the outer ring with a contact angle, and
wherein the supply hole provided in the outer ring spacer opens at a position apart from a contact area between the ball and the outer ring race.

5. The rolling bearing according to claim 1, wherein the rolling bearing is used to support a spindle of a machine tool.

6. The rolling bearing according to claim 1, wherein the rolling bearing is used in an operating condition where dmN is not smaller than 1,000,000.

7. A spindle device for a machine tool comprising:
a rolling bearing for supporting a spindle, the rolling bearing being mounted in a housing, the rolling bearing being grease-lubricated, the rolling bearing comprising:
an outer ring having an outer ring race in an inner peripheral surface thereof;
an inner ring having an inner ring race in an outer peripheral surface thereof;
rolling elements rollably provided between the outer ring race and the inner ring race;
a grease supplying element for supplying an additional grease in the rolling bearing; and
an outer ring spacer,
wherein the amount of the additional grease to be supplied at a time is predetermined to be from 0.1 to 4% of the volume of space in the bearing, and
wherein the grease supplying element is a supply hole provided in the outer ring spacer, and
wherein the diameter of the supply hole is from 0.1 mm to 5 mm.

8. The spindle device according to claim 7, wherein the supply hole extends in a substantially axial direction of the rolling bearing.

9. The spindle device according to claim 7, wherein the rolling element is a ball,
wherein the ball is disposed between the inner ring race of the inner ring and the outer ring race of the outer ring with a contact angle, and
wherein the supply hole provide in the outer ring spacer opens at a position apart from a contact area between the ball and the outer ring race.

10. The spindle device according to claim 7, wherein the rolling bearing is used to support a spindle of a machine tool.

11. The spindle device according to claim 7, wherein the rolling bearing is used in an operating condition where dmN is not smaller than 1,000,000.

* * * * *